(12) United States Patent
Yi et al.

(10) Patent No.: US 8,096,480 B2
(45) Date of Patent: Jan. 17, 2012

(54) SYSTEM AND METHOD FOR ENCODING AND DECODING LARGE CAPACITY 2-DIMENSIONAL COLOR BAR CODE WHICH CAN BE COLOR-CORRECTED

(75) Inventors: Dong-In Yi, Seoul (KR); Seong-Won Yuk, Seongnam-si (KR); Chae-Wook Lee, Daegu (KR)

(73) Assignee: Voiceye, Inc., Seoul (KR)

( * ) Notice: Subject to any disclaimer, the term of this patent is extended or adjusted under 35 U.S.C. 154(b) by 0 days.

(21) Appl. No.: 13/023,827

(22) Filed: Feb. 9, 2011

(65) Prior Publication Data

US 2011/0186632 A1    Aug. 4, 2011

Related U.S. Application Data

(62) Division of application No. 11/587,321, filed as application No. PCT/KR2005/000277 on Jan. 31, 2005, now Pat. No. 8,006,911.

(30) Foreign Application Priority Data

Apr. 21, 2004   (KR) .................. 10-2004-0027600

(51) Int. Cl.
*G06K 19/06* (2006.01)
(52) U.S. Cl. .................... 235/494; 235/462.1
(58) Field of Classification Search .............. 235/437, 235/462.04, 462.09, 462.02, 462.08, 462.01
See application file for complete search history.

(56) References Cited

U.S. PATENT DOCUMENTS

| | | | |
|---|---|---|---|
| 5,134,272 A * | 7/1992 | Tsuchiya et al. | 235/462.08 |
| 5,343,028 A | 8/1994 | Figarella et al. | |
| 5,428,211 A * | 6/1995 | Zheng et al. | 235/462.02 |
| 5,489,769 A * | 2/1996 | Kubo | 235/462.09 |
| 5,557,091 A * | 9/1996 | Krummel | 235/462.08 |
| 5,862,270 A | 1/1999 | Lopresti et al. | |
| 5,979,768 A * | 11/1999 | Koenck | 235/470 |
| 6,070,805 A | 6/2000 | Kaufman et al. | |
| 6,123,261 A * | 9/2000 | Roustaei | 235/462.01 |
| 6,672,511 B1 * | 1/2004 | Shellhammer | 235/462.08 |
| 7,032,823 B2 | 4/2006 | Nojiri | |
| 2001/0015815 A1 | 8/2001 | Hada et al. | |
| 2002/0020747 A1 | 2/2002 | Wakamiya et al. | |
| 2002/0145751 A1 * | 10/2002 | Park et al. | 358/1.15 |
| 2005/0284944 A1 | 12/2005 | Ming | |

FOREIGN PATENT DOCUMENTS

KR   10 2003 0082300   10/2003

* cited by examiner

*Primary Examiner* — Steven S Paik
*Assistant Examiner* — Sonji Johnson
(74) *Attorney, Agent, or Firm* — Ballard Spahr LLP

(57) ABSTRACT

Disclosed herein are a bar code encoding system and a bar code decoding system. The bar code encoding system includes a method for compressing the original data and adding data for error detection and correction to the compressed data to generate a large capacity 2-dimensional color bar code so as to be used as prints in an off-line environment and a large capacity 2-dimensional bar code pattern. The decoding system includes a method for receiving the prints including the 2-dimensional bar code generated by the encoding system through an input device such as a scanner and a camera, searching the 2-dimensional bar code to recognize it, performing color correction and error detection and correction, decompressing the compressed data to decode the original data.

18 Claims, 25 Drawing Sheets

22 Pixel

| PATTERN | RGB VALUE (R.G.B) | BINARY VALUE |
|---|---|---|
| ☐ | (255.255.255) | 1 1 1 |
| ■ | (255. 0. 0) | 1 0 0 |
| ■ | ( 0.255. 0) | 0 1 0 |
| ■ | ( 0. 0.255) | 0 0 1 |
| ■ | ( 0.255.255) | 0 1 1 |
| ■ | (255. 0.255) | 1 0 1 |
| ■ | (255.255. 0) | 1 1 0 |
| ■ | ( 0. 0. 0) | 0 0 0 |

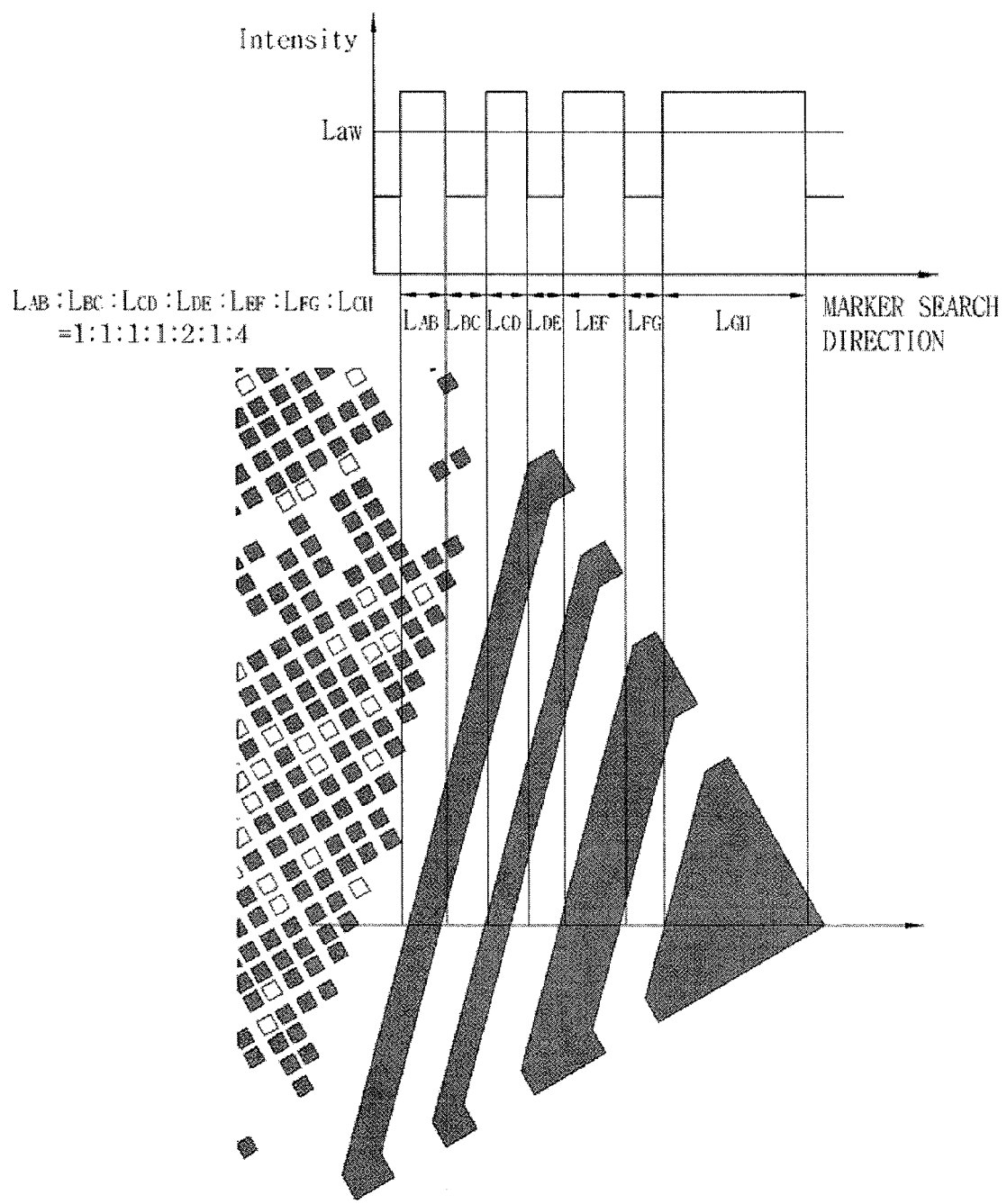

FIG. 18b

| SAMPLING POINT | RGB VALUE (R,G,B) | BINARY VALUE |
|---|---|---|
| $SP_{111}$ | (255,255,255) | 1 1 1 |
| $SP_{100}$ | (224, 85, 54) | 1 0 0 |
| $SP_{010}$ | (60,186, 58) | 0 1 0 |
| $SP_{001}$ | (44, 68,176) | 0 0 1 |
| $SP_{011}$ | (58,160,245) | 0 1 1 |
| $SP_{101}$ | (241, 47, 96) | 1 0 1 |
| $SP_{110}$ | (254,240, 19) | 1 1 0 |
| $SP_{000}$ | (17, 15, 12) | 0 0 0 | ously filed on Aug. 6, 2007, now U.S. Pat. No. 8,006,911 which is a National Phase Application of International Application No. PCT/KR2005/000277, filed Jan. 31, 2005, which claims priority to Korean Patent Application No. 10-2004-0027600, filed Apr. 21, 2004, the entirety of which is incorporated herein by reference.

SYSTEM AND METHOD FOR ENCODING AND DECODING LARGE CAPACITY 2-DIMENSIONAL COLOR BAR CODE WHICH CAN BE COLOR-CORRECTED

CROSS REFERENCE TO RELATED PATENT APPLICATIONS

This application is a divisional of application Ser. No. 11/587,321 filed on Aug. 6, 2007, now U.S. Pat. No. 8,006,911 which is a National Phase Application of International Application No. PCT/KR2005/000277, filed Jan. 31, 2005, which claims priority to Korean Patent Application No. 10-2004-0027600, filed Apr. 21, 2004, the entirety of which is incorporated herein by reference.

TECHNICAL FIELD

The present invention relates to a system and method for encoding the original data into a large capacity 2-dimensional color bar code that can be color-corrected in on/off-line environments, and a system and method for decoding the original data from the generated large capacity 2-dimensional color bar code. More particularly, the invention relates to a bar code encoding system including a method for compressing the original data and adding data for error detection and correction to the compressed data to generate a large capacity 2-dimensional color bar code so as to be used as prints in an off-line environment and a large capacity 2-dimensional bar code pattern, and a decoding system including a method for receiving the prints including the 2-dimensional bar code generated by the encoding system through an input device such as a scanner and a camera, searching the 2-dimensional bar code to recognize it, performing color correction and error detection and correction, decompressing the compressed data to decode the original data.

BACKGROUND ART

A conventional one-dimensional bar code cannot store a large quantity of data. With the popularization of input/output devices such printers, scanners and digital cameras, studies on a 2-dimensional bar code capable of storing larger amount of data than the one-dimensional bar code are being actively carried out. That is, attempts to improve efficiency and convenience in transmission and representation of data using the 2-dimensional bar code are being made in various fields.

The 2-dimensional bar code used for the attempts should be generated without having restrictions on its size and store a large quantity of data per unit area. Furthermore, the 2-dimensional bar code requires short recognition time and excellent decoding capability when decoded. The 2-dimensional bar code can be used only in a restricted field unless these conditions are satisfied.

FIGS. 1a and 1b illustrate 2-dimensional bar codes using Maxi code among conventional standard 2-dimensional bar codes. Referring to FIGS. 1a and 1b, the Maxi code is composed of a central finder pattern surrounded by a tetragonal arrangement of hexagonal module offset rows. The finder pattern includes three black concentric circles, and information about direction can be known from six patterns (inside the circles) composed of three modules at the corners of a hexagon. However, the Maxi code requires long recognition time because all the six patterns should be searched when patterns about direction are searched.

FIG. 1c illustrates a 2-dimensional bar code using QR code among the conventional standard 2-dimensional bar codes. Referring to FIG. 1c, a finder pattern of the QR code is composed of three identical position detection patterns respectively disposed at the left top, right top and left bottom of a symbol. The QR code symbol has been encoded preferentially such that probability that similar patterns come into contact with the region outside the symbol is low, to enable rapid recognition. Furthermore, recognition of the three position detection patterns constructing the finder pattern correctly defines the direction of the symbol position in the range of vision.

In the case of the QR code, however, all the three position detection patterns should be searched and, when any one of the position detection patterns is damaged, the position and direction of the symbol are difficult to define.

The aforementioned conventional 2-dimensional bar codes have following problems. Firstly, the sizes of the conventional 2-dimensional bar codes should be increased to store large capacity because capacity per unit area is small, and a long period of bar code search time is required when the 2-dimensional bar codes are recognized. Furthermore, the sizes of the conventional 2-dimensional bar codes are fixed when generated or difficult to set and thus they cannot be applied to various fields. Accordingly, it is difficult to realize large capacity data such as text data, photograph data and audio data in the form of the conventional 2-dimensional bar codes so that the conventional 2-dimensional bar codes have been applied to only a specific field.

While there is a method of adding colors and gray to a conventional black-and-white 2-dimensional bar code to increase capacity, correct decoding cannot be performed in this case because a difference between the color of print and the original color is generated.

DISCLOSURE OF INVENTION

Technical Problem

Accordingly, the present invention provides a system and method for encoding the original data into a large capacity 2-dimensional color bar code in on/off-line environments and a system and method for decoding the generated large capacity 2-dimensional color barcode into the original data.

Technical Solution

The present invention provides a bar code encoding system including a method for compressing the original data and adding data for error detection and correction to the compressed data to generate a large capacity 2-dimensional color bar code so as to be used as prints in an off-line environment and a large capacity 2-dimensional bar code pattern, and a decoding system including a method for receiving the prints including the 2-dimensional bar code generated by the encoding system through an input device such as a scanner and a camera, searching the 2-dimensional bar code to recognize it, performing color correction and error detection and correction, decompressing the compressed data to decode the original data.

Advantageous Effects

The present invention can generate a 2-dimensional color bar code capable of storing larger capacity per unit area than the conventional 2-dimensional bar code and recognize the large capacity 2-dimensional color bar code rapidly. Furthermore, the present invention can recognize the large capacity 2-dimensional color bar code with high recognizability even when a part of the bar code is damaged and the bar code is poorly colored, poorly printed or poorly scanned. Moreover, the present invention can improve capability of restoring the original data from the large capacity 2-dimensional color bar code and flexibly set the size of the large capacity 2-dimensional color bar code when the color bar code is generated.

BRIEF DESCRIPTION OF THE DRAWINGS

Further objects and advantages of the invention can be more fully understood from the following detailed description taken in conjunction with the accompanying drawings, in which:

FIG. 10b illustrates the concept of searching for a bar code search pattern in an X-axis backward direction;

FIG. 18b shows RGB values read from sampling points of FIG. 18a.

BEST MODE FOR CARRYING OUT THE INVENTION

Figure 1A:
FIG. 1a illustrates the print of a 2-dimensional bar code using Maxi code among conventional standard 2-dimensional bar codes.
Figure 1B:
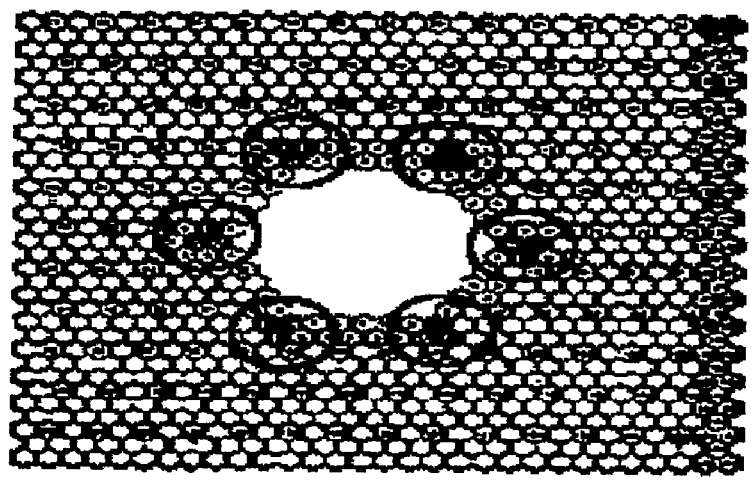
FIG. 1b is a conceptual view of a 2-dimensional bar code using Maxi code among the conventional standard 2-dimensional bar codes.
Figure 1C:
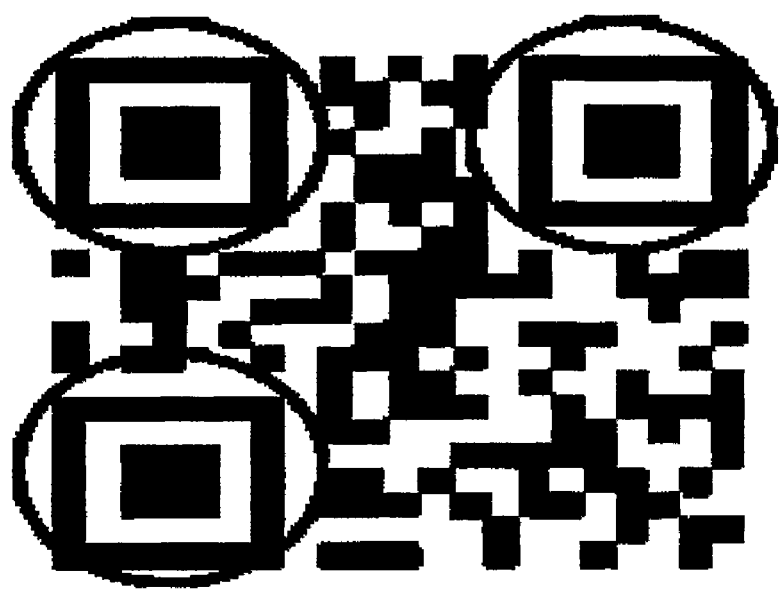
FIG. 1c illustrates a 2-dimensional bar code using QR code among the conventional standard 2-dimensional bar codes.

The present invention provides a method for encoding a large capacity 2-dimensional color bar code that can be color-corrected, comprising the steps of: forming a color correction pattern for correcting colors used for the 2-dimensional bar code; forming a 2-dimensional bar code start pattern for indicating the start point of the 2-dimensional bar code, the 2-dimensional bar code start pattern being composed of a plurality of square pixels, the 2-dimensional bar code start pattern including a one-dimensional pattern in which black and white portions are alternately arranged; forming a 2-dimensional bar code search pattern having black and white stripes having a specific width in a right-angled equilateral triangle having two 2-dimensional bar code start patterns including the one-dimensional pattern as two sides thereof, the lengths of X-axis and Y-axis sides of the right-angled equilateral triangle being identical to each other; forming position correcting markers at the end points of the X-axis and Y-axis sides of the 2-dimensional bar code search pattern and the intersection of lines respectively extended from the end points, respectively, each position correcting marker being in the form of square and having a predetermined number of pixels in horizontal and vertical directions, each position correcting marker having a black central pixel and white pixels surrounding the black central pixel; forming at least one meta data between the position correcting markers, the meta data including a ratio of the height/width of the 2-dimensional bar code to the quantity of additional data for error correction, the meta data including additional data for correcting an error thereof; and converting the original data to be included in the bar code and additional data for error correction into color pixels.

The present invention also provides a system for encoding a large capacity 2-dimensional color bar code that can be color-corrected, comprising: a pattern generator for generating a 2-dimensional bar code start pattern for indicating the start point of the 2-dimensional bar code and a bar code search pattern having black and white stripes having a specific width in a right-angled equilateral triangle having two 2-dimensional bar code start patterns as two sides thereof, the 2-dimensional bar code start pattern being composed of a plurality of square pixels and including a one-dimensional pattern in which black and white portions are alternately arranged, the lengths of X-axis and Y-axis sides of the right-angled equilateral triangle being identical to each other; a position correcting marker generator for forming position correcting markers at the end points of the X-axis and Y-axis sides of the 2-dimensional bar code search pattern and the intersection of lines respectively extended from the end points, respectively, each position correcting marker being in the form of square and having a predetermined number of pixels in horizontal and vertical directions, each position correcting marker having a black central pixel and white pixels surrounding the black central pixel; and a meta data generator for generating at least one meta data between the position correcting markers, the meta data including a ratio of the height/width of the 2-dimensional bar code to the quantity of additional data for error correction, the meta data including additional data for correcting an error thereof.

The present invention also provides a method for decoding a large capacity 2-dimensional color bar code that can be color-corrected, comprising: a first step of reading an encoded 2-dimensional bar code image and searching for a bar code search pattern to obtain the coordinates and slope of a bar code start position on a memory; a second step of searching for corner points E1 and E2 of the searched bar code search pattern; a third step of searching for the coordinates of position correcting markers using the coordinates of the bar code search pattern and the corner points of the bar code search pattern; and a fourth step of reading the coordinates, data value and meta data of a data pattern of each section using the searched coordinates of the position correcting markers.

The present invention also provides a system for decoding a large capacity 2-dimensional color bar code that can be color-corrected, comprising: a bar code search pattern searching unit for receiving a 2-dimensional bar code image and searching for a bar code search pattern of the 2-dimensional bar code to obtain the coordinates and slope of the bar code start point; a bar code search pattern corner point searching unit for obtaining corner points of the bar code search pattern using the searched coordinates of the bar code search pattern; a position correcting marker searching unit for searching for the coordinates of position correcting markers using the coordinates of the bar code search pattern and the corner points; and a data extracting unit for extracting data with reference to the searched coordinates of the position correcting markers.

In an aspect of the present invention, the right-angled two sides of the 2-dimensional bar code search pattern each include a plurality of bar code start patterns.

In an aspect of the present invention, the 2-dimensional bar code search pattern is located at the left top of the 2-dimensional bar code.

In an aspect of the present invention, each of the position correcting markers is formed in a tetragonal pattern for each recorded data block.

In an aspect of the present invention, the position correcting markers include virtual markers to process data pattern coordinates that do not belong to any one of the corners of the 2-dimensional bar code when the position correcting markers cover only a part of the bar code. The virtual markers are obtained by extending the position correcting markers at the corners of the bar code.

Mode for Invention

The present invention will now be described in detail in connection with preferred embodiments with reference to the accompanying drawings. For reference, like reference characters designate corresponding parts throughout several views.

A system and method for encoding/decoding a 2-dimensional bar code according to an embodiment of the present invention will now be explained with reference to the attached drawings.

Figure 2:
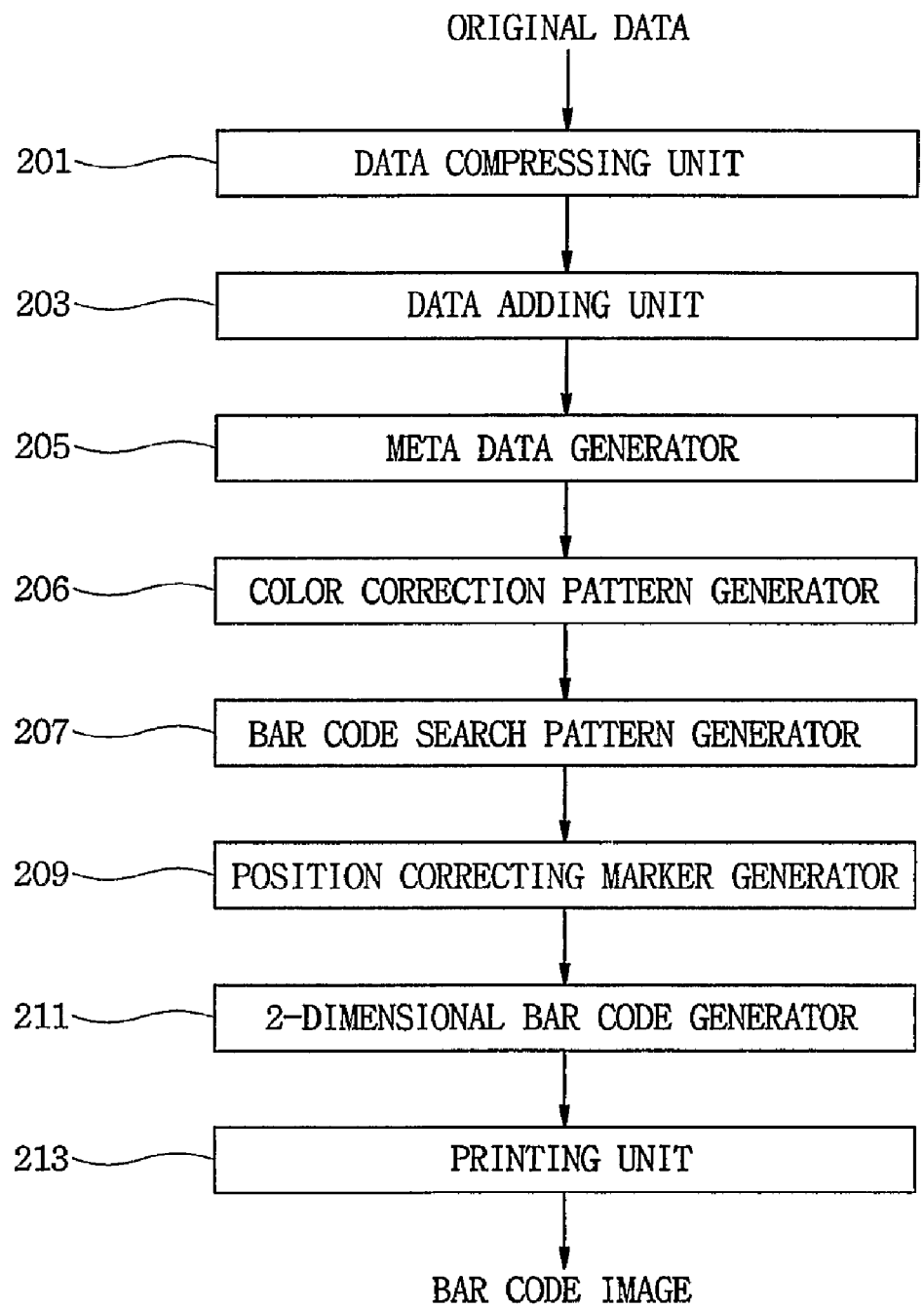
FIG. 2 is a block diagram of a 2-dimensional bar code image encoding system according to an embodiment of the present invention.

FIG. 2 is a block diagram of a 2-dimensional bar code image encoding system according to an embodiment of the present invention. Referring to FIG. 2, the 2-dimensional bar code image encoding system includes a data compressing unit 201, a data adding unit 203, a meta data generator 205, a color correction pattern generator 206, a bar code search pattern generator 207, a position correction marker generator 209, a 2-dimensional bar code generator 211, and a printing unit 213.

The data compressing unit 201 compresses the original data using an algorithm employing Hoffman code to obtain data having capacity smaller than the capacity of the original data. The data adding unit 203 adds additional data for error detection/correction to the data compressed by the data compressing unit 201.

The meta data generator 205 calculates the horizontal and vertical lengths of a bar code in a minimum size that can fully represent data to be encoded, and then generates meta data including a ratio of the horizontal and vertical lengths of the bar code to the quantity of the additional data. The meta data includes additional data for correcting an error in the meta data itself. That is, the meta data includes a version, a format, additional data, information for error detection/correction, and information about the width and height of a 2-dimensional bar code.

The color correction pattern generator 206 sequentially generates all colors used to generate the bar code in a rectangular pattern in a specific region. The bar code search pattern generator 207 generates a bar code search pattern and marks the bar code search pattern on a specific region of the bar code. Here, the specific region corresponds to the left top of the bar code in the embodiment of the present invention.

The position correcting marker generator 209 generates position correcting markers to be used to correct the position of the bar code image when the bar code image is decoded. Here, each of the position correcting markers is generated for each data block and has a tetragonal pattern.

The 2-dimensional bar code generator 211 2-dimensionally barcodes the aforementioned contents, and the printing unit 213 prints the generated 2-dimensional bar code.

Figure 3:
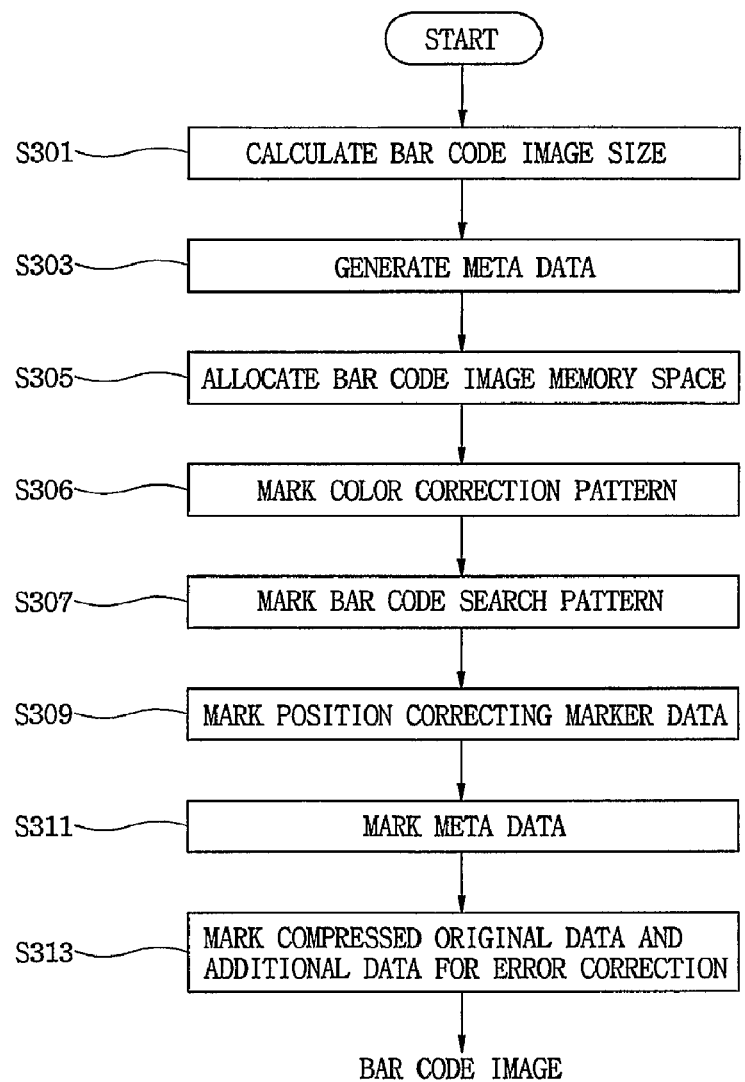
FIG. 3 is a flow chart showing the operation of the 2-dimensional bar code encoding system of FIG. 2.

FIG. 3 is a flow chart showing the operation of the 2-dimensional bar code encoding system of FIG. 2. Referring to FIG. 3, in the step S301, the original data is compressed using an algorithm employing Hoffman code to obtain data having capacity smaller than the capacity of the original data, and then the horizontal and vertical lengths of a bar code in a minimum size that can fully represent data to be encoded are calculated.

In the step S303, the meta data including a ratio of the horizontal and vertical lengths of the bar code to the quantity of additional data is generated. The meta data includes additional data for correcting an error thereof.

In the step S305, a bit map memory space where a bar code image to be generated will be stored is allocated. In the step S307, the bar code search pattern is marked on the left top of the bar code.

In the step S306, a rectangular pattern composed of sequentially arranged colors used to generate the bar code is formed in a specific region at the top of the bar code. Subsequently, position correcting markers are marked in the step S309, and then the meta data is marked on the left top, left bottom, right top and right bottom portions of the bar code in a bar code image memory, respectively, in the step S311. In the step S313, the compressed original data and the additional data for error correction are marked in the bar code image memory, to thereby generate the 2-dimensional bar code.

Figure 4A:
FIGS. 4a and 4b are conceptual views showing a 2-dimensional bar code start pattern and a 2-dimensional bar code search pattern according to an embodiment of the present invention.
Figures 4B, 4C:
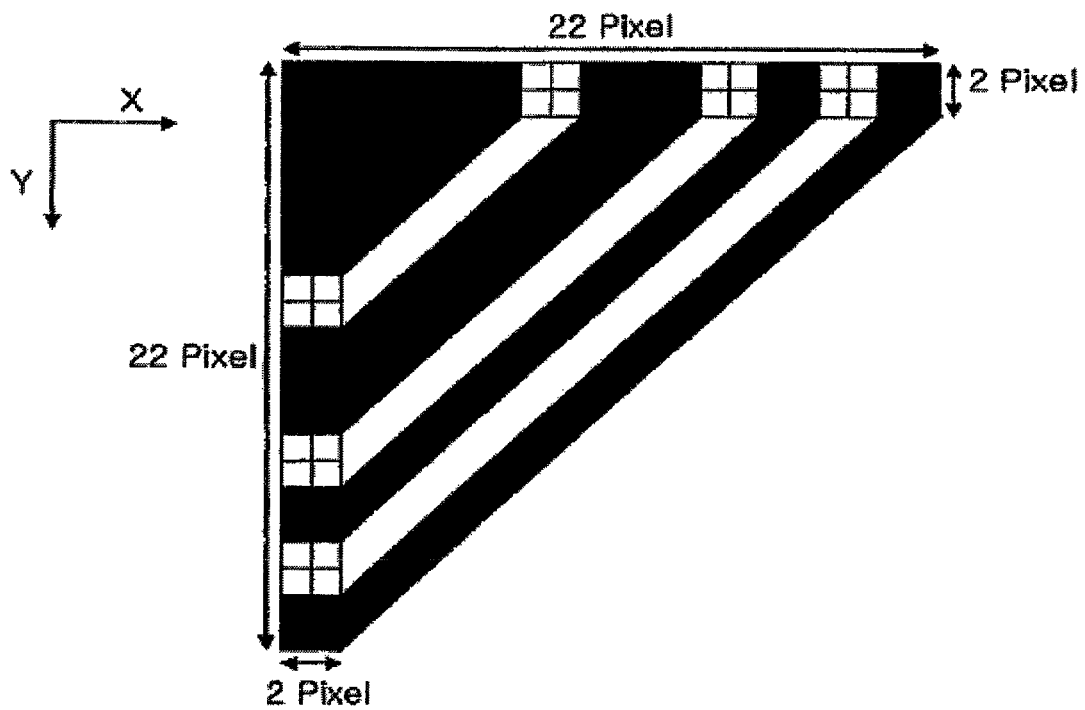
FIG. 4c is a table showing the relationship between the colors and binary values of 2-dimensional bar code data patterns according to an embodiment of the present invention.

FIGS. 4a and 4b are conceptual views showing a start pattern and a search pattern of a 2-dimensional bar code according to an embodiment of the present invention. The start pattern shown in FIG. 4a is included in the search pattern shown in FIG. 4b.

Referring to FIG. 4a, the bar code start pattern according to an embodiment of the present invention is a one-dimensional pattern having bright and dark portions that are alternately arranged to indicate the start point of the bar code. In the embodiment of the present invention, the start pattern is composed of 22 pixels and a ratio of the lengths of the alternately arranged bright and dark portions is 8:2:4:2:2:2. This ratio can be varied depending on a bar code designer.

Referring to FIG. 4b, the bar code search pattern according to an embodiment of the present invention is a 2-dimensional pattern having bright and dark portions alternately arranged. In the embodiment of the present invention, the bar code search pattern is 22 pixels in length, 22 pixels in width and 22 pixels in thickness and is in the form of right-angled triangle having lengths X and Y identical to each other.

The bar code search pattern in the form of right-angled triangle is a 2-dimensionally extended pattern, as shown in FIG. 4b. The bar code search pattern is used to obtain the coordinates of the left top of the bar code and rotation information of the bar code from an image scanned when the bar code is decoded.

In the right-angled triangle having the lengths X and Y identical to each other, black and white stripes having a specific width are alternately formed. The bar code search pattern is formed as above because it can be searched even when it is rotated by +90° when unidirectional (X-axis, for example) search is performed.

FIG. 4c is a table showing the relationship between the colors and binary values of 2-dimensional bar code data patterns according to an embodiment of the present invention.

The original data is represented by 3-bit data in the bar code and the 3-bit data is expressed by one of 8 colors shown in FIG. 4c. The 8 colors are obtained from combinations of the three primary colors, red, green and yellow. The value of each of the three primary colors can be varied from 0 to 255 when the colors are combined, and one of 0 and 255 is used when encoding is performed.

Figure 4D:
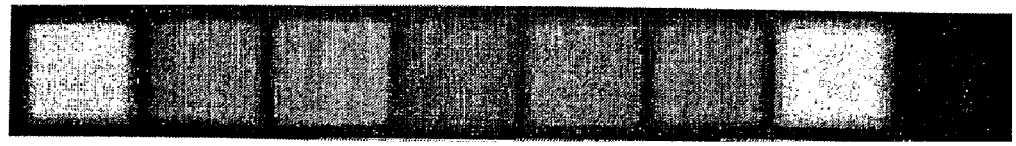
FIG. 4d illustrates a color correction pattern according to an embodiment of the present invention.

FIG. 4d illustrates a color correction pattern according to an embodiment of the present invention. The color correction pattern is obtained by sequentially marking the colors of FIG. 4c in a specific position of the bar code.

The color correction pattern is used as reference data for determining which one of the 8 colors used to generate the bar code corresponds to the color of a bar code image obtained when bar code data is decoded in the case where the color of the bar code image is not identical to the color used when the bar code is generated.

Figure 5:
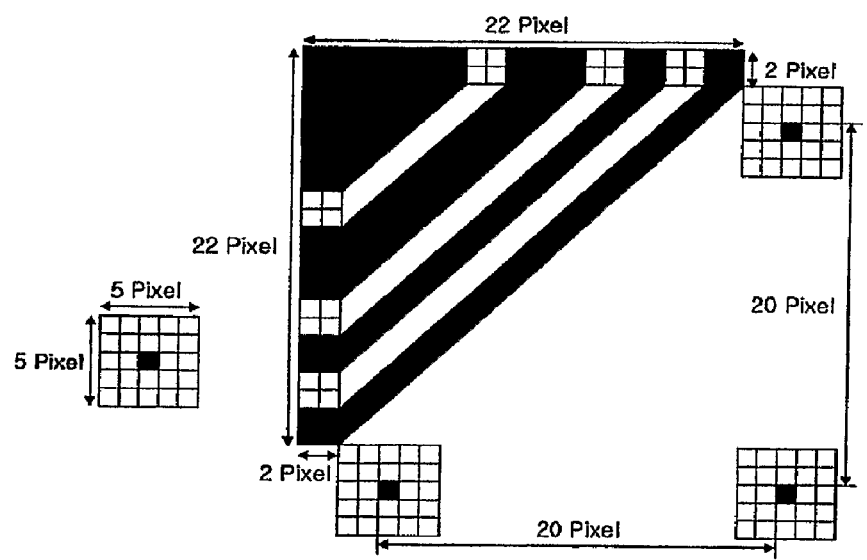
FIG. 5 is a conceptual view showing position correcting markers of a 2-dimensional bar code according to an embodiment of the present invention.

FIG. 5 is a conceptual view showing position correcting markers of a 2-dimensional bar code according to an embodiment of the present invention. Each of the position correcting marker is in the form of square that is 5 pixels in length and 5 pixels in width and has a black pixel at the center point. The position correcting markers are respectively marked on the end points M1 and M2 of the X and Y sides of the bar code search pattern marked in the form of right-angled triangle at the left top of the 2-dimensional bar code and the intersection M3 of lines respectively extended from the end points M1 and M2.

Position correcting markers are generated at points distant from the firstly formed position correcting markers by a predetermined distance in X-axis and Y-axis directions. The position correcting markers formed at a regular interval will be explained in detail with reference to FIG. 6. The position correcting markers are used to obtain bar code data pattern positions from an image scanned when bar code data patterns are restored during a bar code image decoding process.

Figure 6:
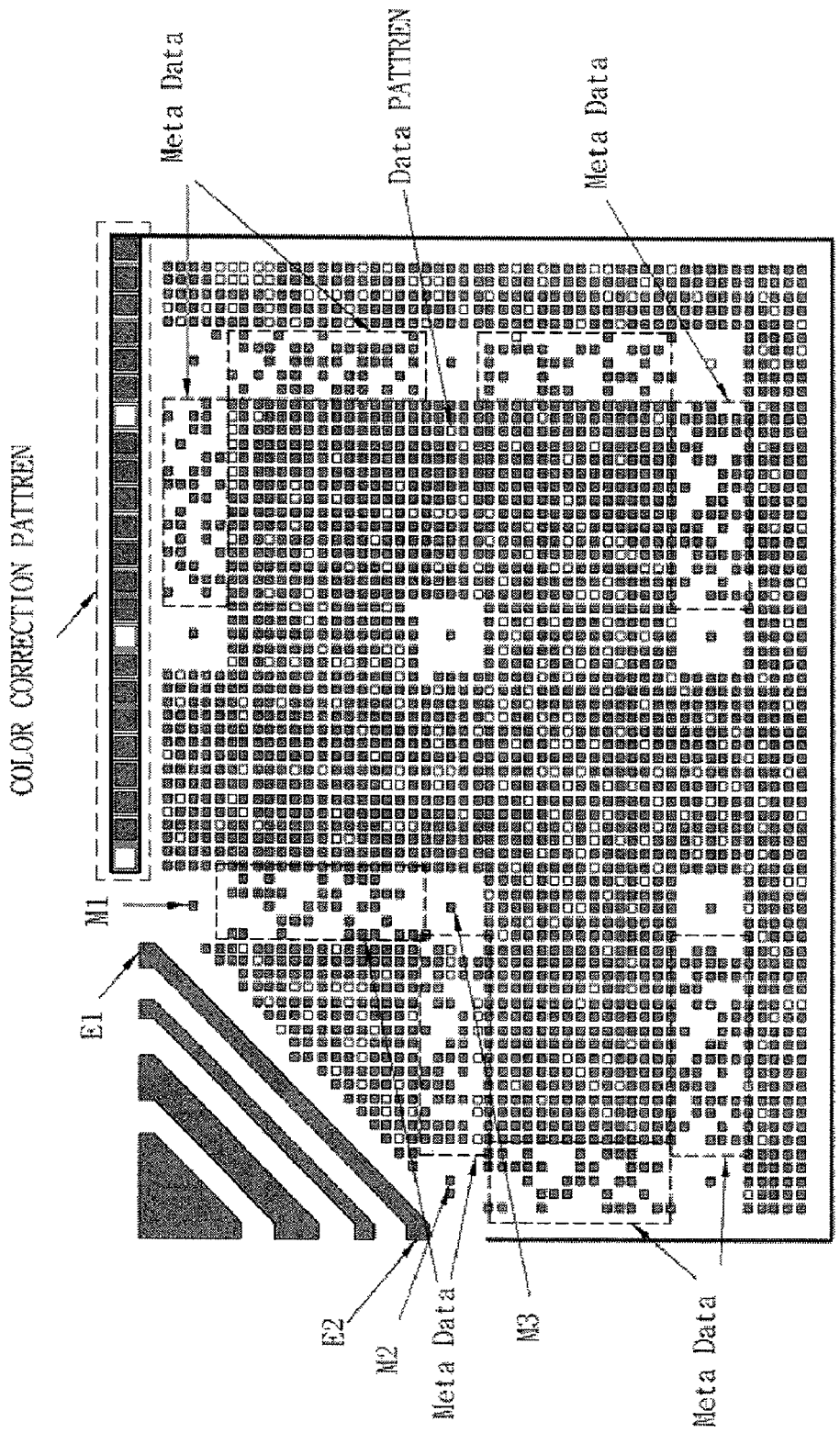
FIG. 6 is a conceptual view showing meta data of a 2-dimensional bar code according to an embodiment of the present invention.

FIG. 6 illustrates a color correction pattern and meta data of a 2-dimensional bar code according to an embodiment of the present invention. Referring to FIG. 6, the color correction pattern is composed of 8 colors used for the bar code. Each of the 8 colors is in a square pattern. The 8 colors are sequentially repeated in the color correction pattern. The color correction pattern is located at the top of the bar code.

The meta data includes a ratio of the height and width of the bar code to the quantity of the additional data for error correction, as described above. The meta data is marked four times all over the 2-dimensional bar code in the embodiment of the present invention.

Firstly, the meta data is marked between a marker M1 and a marker M3 and between a marker M2 and the marker M3 in the 2-dimensional bar code pattern. Secondly, the meta data is marked between a right top marker and a marker left to the right top marker and between the right top marker and a marker under the right top marker. Thirdly; the meta data is marked between a right bottom marker and a marker left to the right bottom marker and between the right bottom marker and a marker above the right bottom marker. Fourthly, the meta data is marked between a left bottom marker and a marker right to the left bottom marker and between the left bottom marker and a marker above the left bottom marker. The reason why identical four meta data are formed is that the bar code can be restored if only one of the four meta data is scanned when the printed bar code is damaged or noise is generated when the bar code is scanned.

While the four meta data are formed in the 2-dimensional bar code in the embodiment of the present invention, one, two or three meta data can be formed depending on a bar code designer.

Figure 7A:
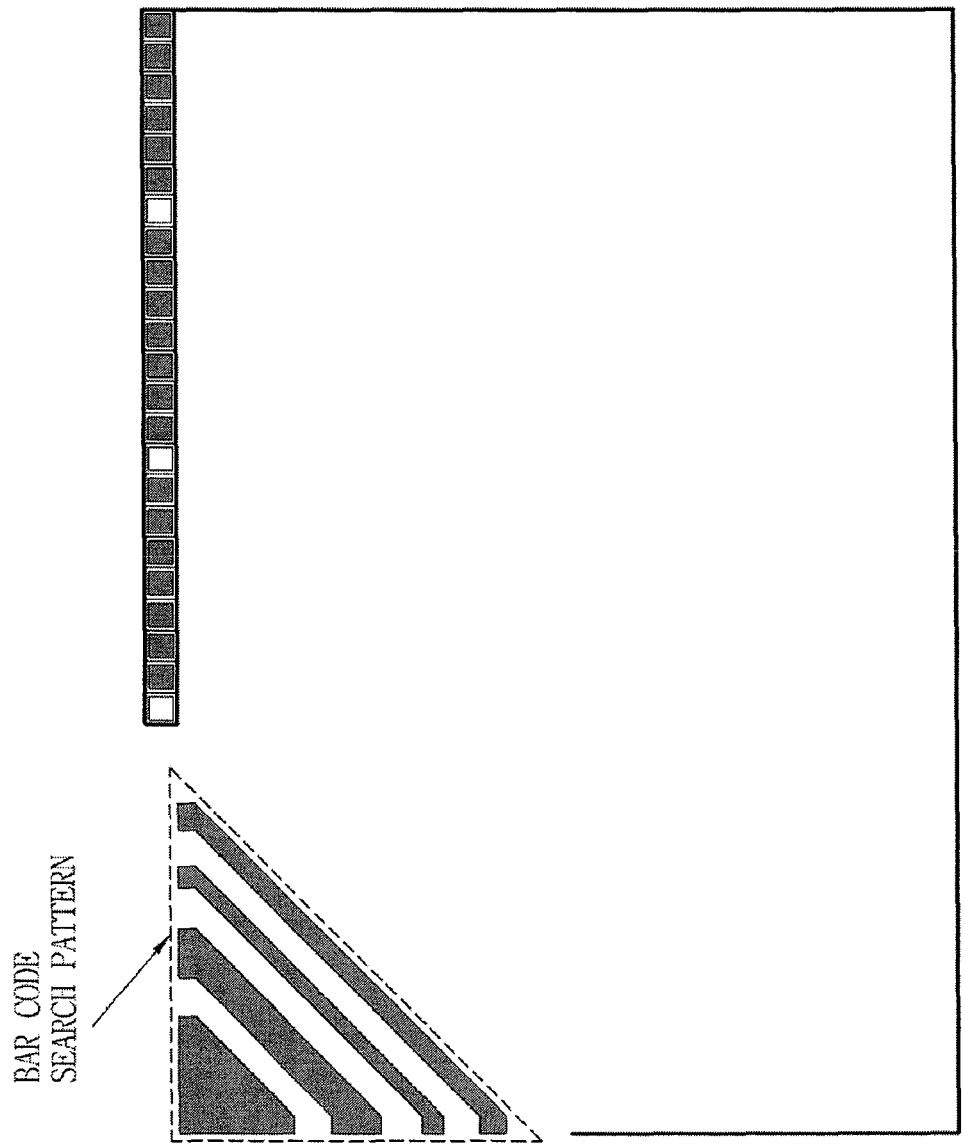
FIGS. 7a, 7b and 7c are conceptual views showing a process of generating a code image of a 2-dimensional bar code including the bar code search pattern, position correcting markers and meta data.
Figure 7B:
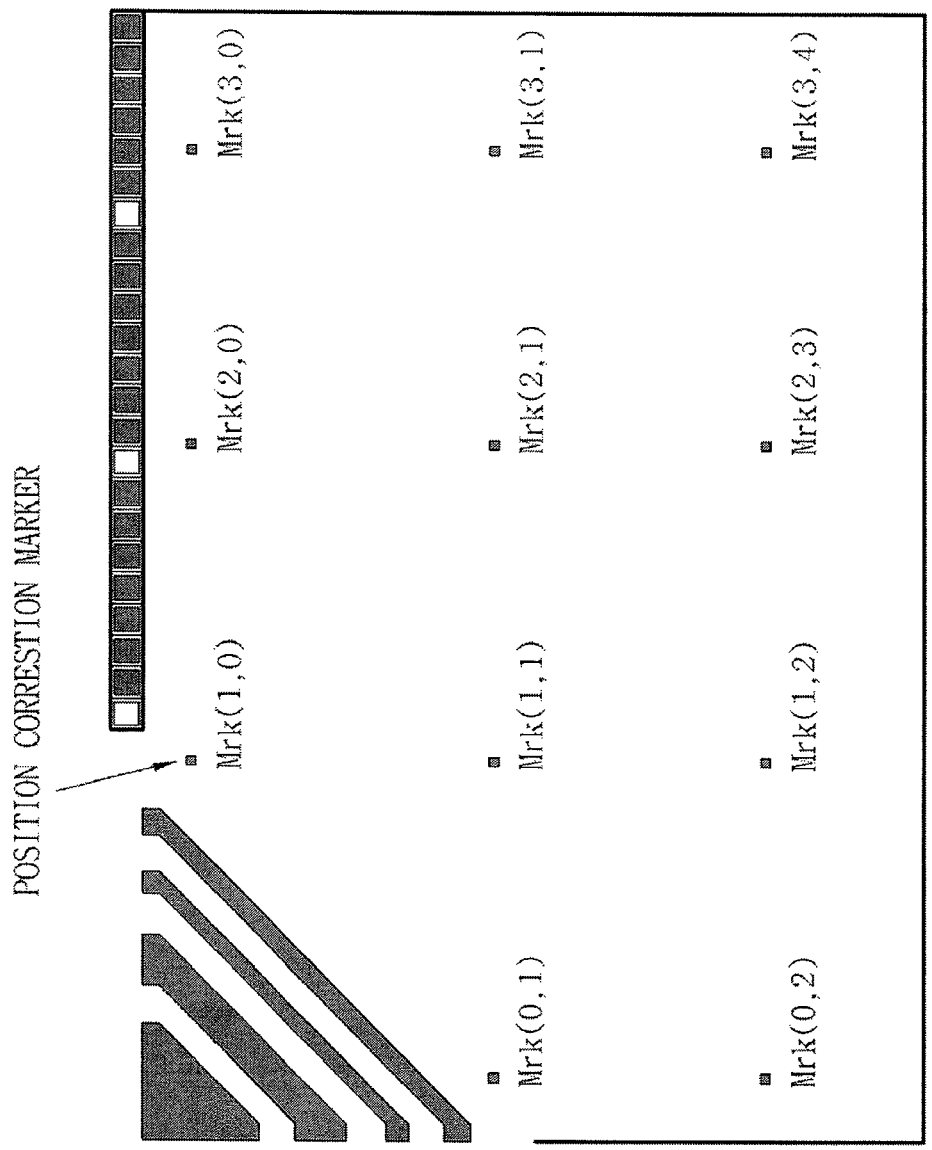
Figure 7C:
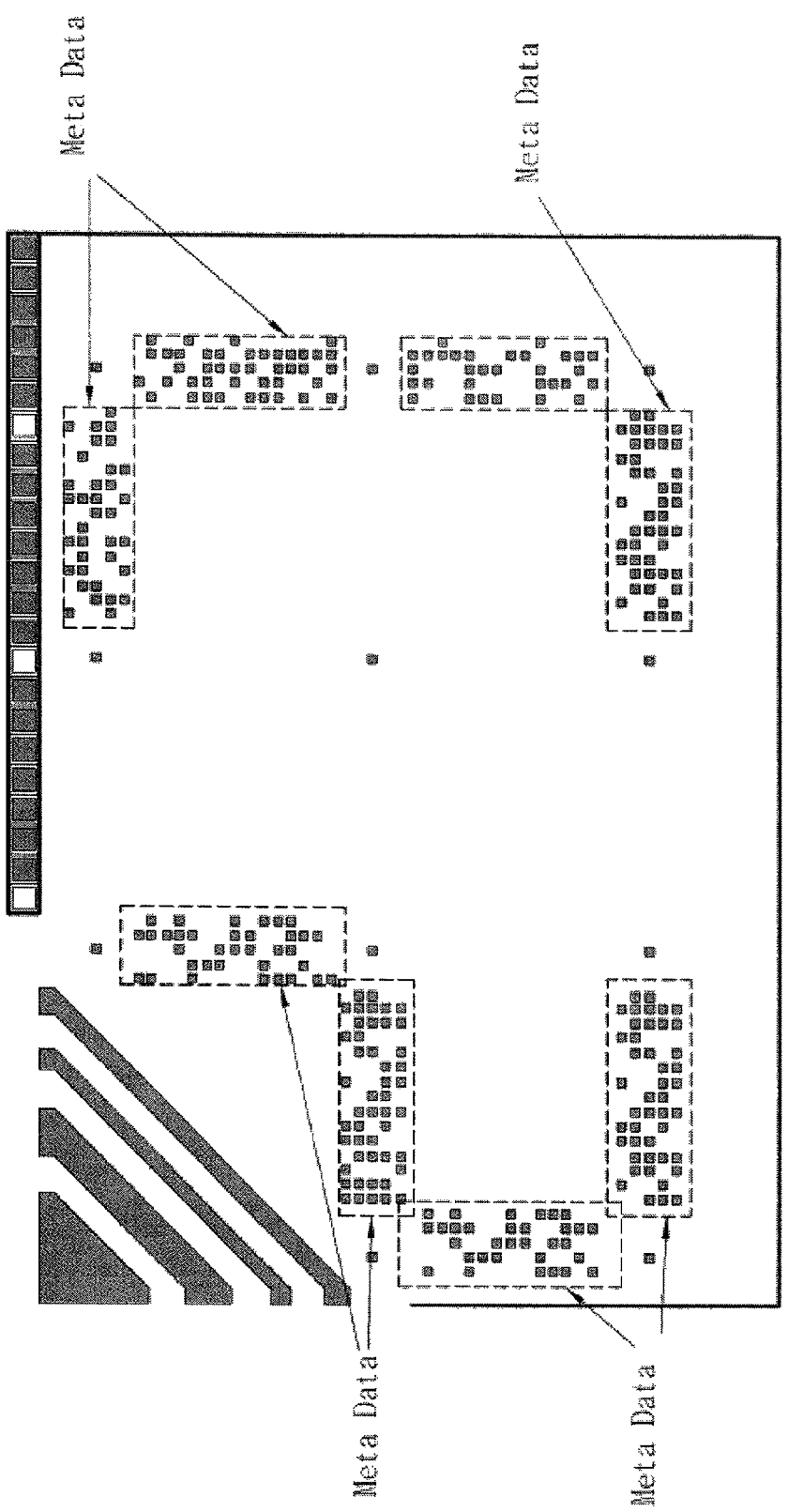

FIGS. 7a, 7b and 7c are conceptual views showing a process of generating a code image of the 2-dimensional bar code including the aforementioned bar code search pattern, position correcting markers and meta data. To generate the code image of the 2-dimensional bar code, the bar code search pattern is generated at the left top of the 2-dimensional bar code first. Subsequently, the position correcting markers are generated at a regular interval, as described above, and then the meta data is formed between the position correcting markers.

In this specification, Mrk(n,m) means a marker that is the nth on the X-axis and the mth on the Y-axis, and X and Y coordinates of Mrk(n,m) are MrkX(n,m) and MrkY(n, m).

Figure 8A:
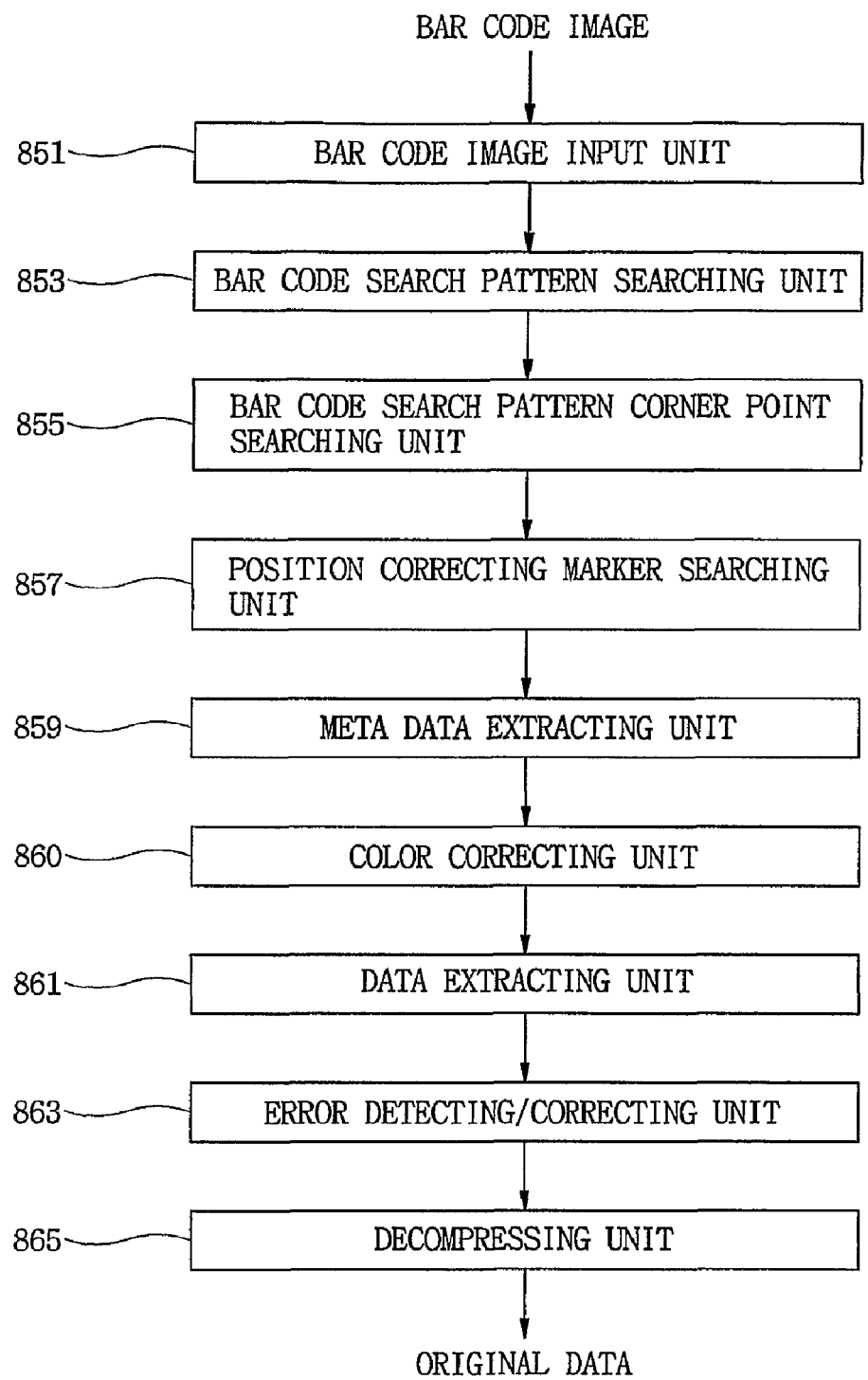
FIG. 8a is a block diagram of a 2-dimensional bar code image decoding system according to an embodiment of the present invention.

FIG. 8a is a block diagram of a 2-dimensional bar code image decoding system according to an embodiment of the present invention. Referring to FIG. 8a, the 2-dimensional bar code image decoding system includes a bar code image input unit 851, a bar code search pattern searching unit 853, a bar code search pattern corner point searching unit 855, a position correcting marker searching unit 857, a meta data extracting unit 859, a color correcting unit 860, a data extracting unit 861, an error detecting/correcting unit 863, and a decompressing unit 865.

The bar code image input unit 851 samples a printed 2-dimensional bar code image using an input device such as a scanner and a camera, reads the bar code image and stores the read bar code image in a bar code image memory.

The bar code search pattern searching unit 853 searches the bar code image memory for the bar code search pattern of the bar code to detect the coordinates and slope of a bar code start point on the memory.

The bar code search pattern corner point searching unit 855 obtains the coordinates of corner points E1 and E2 of the bar code search pattern using the coordinates of the bar code searching pattern detected from the bar code image memory.

The position correcting marker searching unit 857 searches for the coordinates of the position correcting markers using the coordinates of the bar code search pattern and the corner points E1 and E2.

There are multiple position correcting markers in the 2-dimensional bar code. Accordingly, the first position correcting marker is searched starting from the intersection of vertical and horizontal sides of the 2-dimensional bar code pattern, and then the next position correcting marker is searched using the searched first marker.

The meta data extracting unit 859 extracts the meta data with reference to the coordinates of the searched position correcting markers. The color correcting unit 860 reads the 8 colors of the color correction pattern, selects colors the most similar to the colors of data block patterns of the bar code from the 8 colors of the color correction pattern, and converts the colors of the data block patterns into the selected colors.

The data extracting unit 861 extracts the compressed original data including the additional data for error detection/correction from the data block patterns.

The error detecting/correcting unit 863 performs error detection/correction with reference to the additional data for error detection/correction.

The decompressing unit 865 decompresses the original data compressed in the encoding process to decode the original data.

Figure 8B:
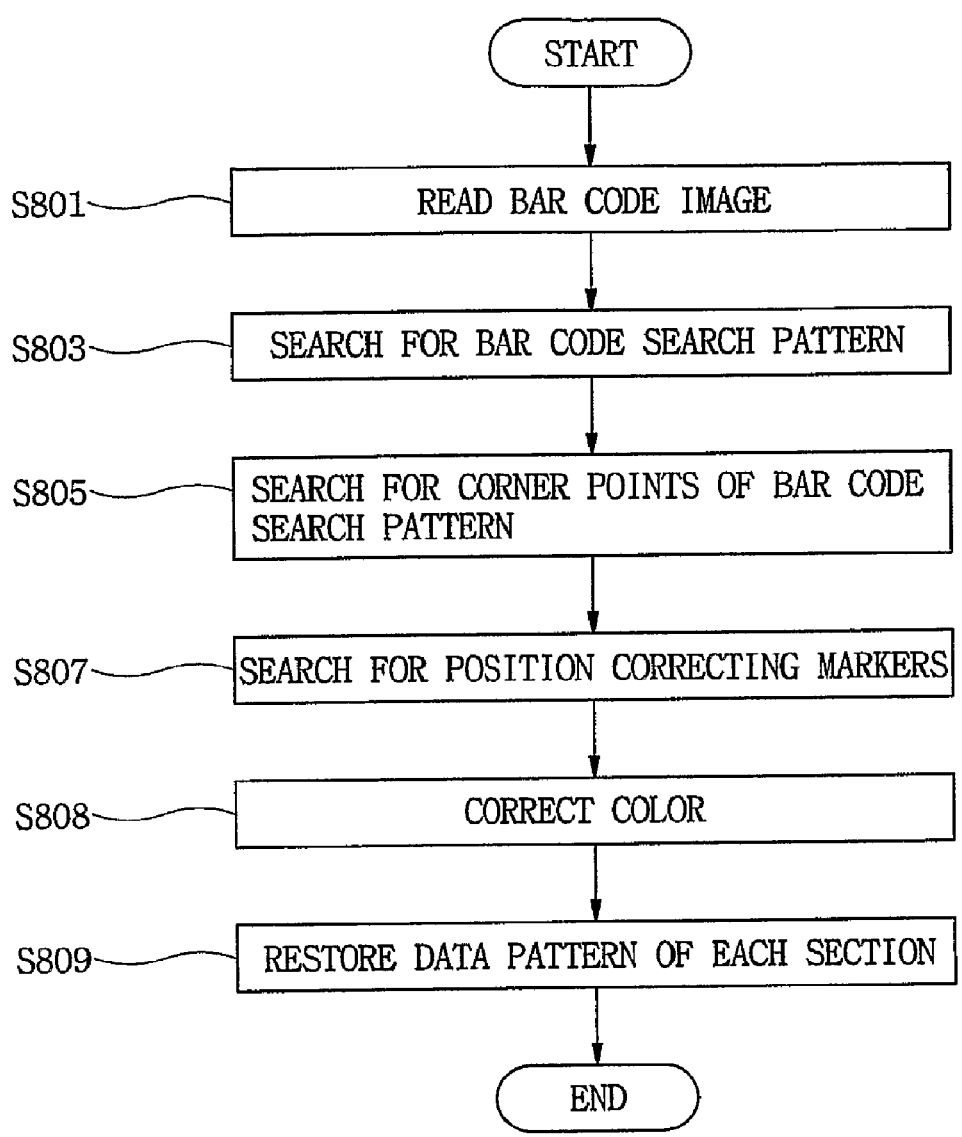
FIG. 8b is a flow chart showing the operation of the 2-dimensional bar code image decoding system according to an embodiment of the present invention.

FIG. 8b is a flow chart showing the operation of the 2-dimensional bar code image decoding system according to an embodiment of the present invention. Referring to FIG. 8b, a bar code image to be decoded is read in the step S801. Here, the bar code image is read using a scanner or a camera, and the printed bar code image is sampled and read to the bar code image memory.

Then, the bar code search pattern of the bar code is searched in the step S803. Here, the bar code image memory is searched for the bar code search pattern of the bar code to find out the coordinates and slope of the bar code start point on the memory.

Subsequently, corner points of the bar code search pattern are searched in the step S805. Here, the coordinates of the corner points E1 and E2 of the bar code search pattern are obtained using the coordinates of the bar code search pattern found in the bar code image memory.

The coordinates of the position correcting markers are searched in the step S807. Here, the coordinates of the first position correcting marker are searched using the coordinates of the searched bar code search pattern and the corner points E1 and E2 and the next marker is found using the searched marker.

In the step S808, the 8 colors of the color correction pattern are read and colors the most similar to the colors of data block patterns of the bar code are selected from the 8 colors of the color correction pattern. Then, the colors of the data block patterns are converted into the selected colors. In the step S809, the coordinates and data values of the data patterns are read using the position correcting markers, and the process is finished. Here, the meta data is extracted.

Figure 9:
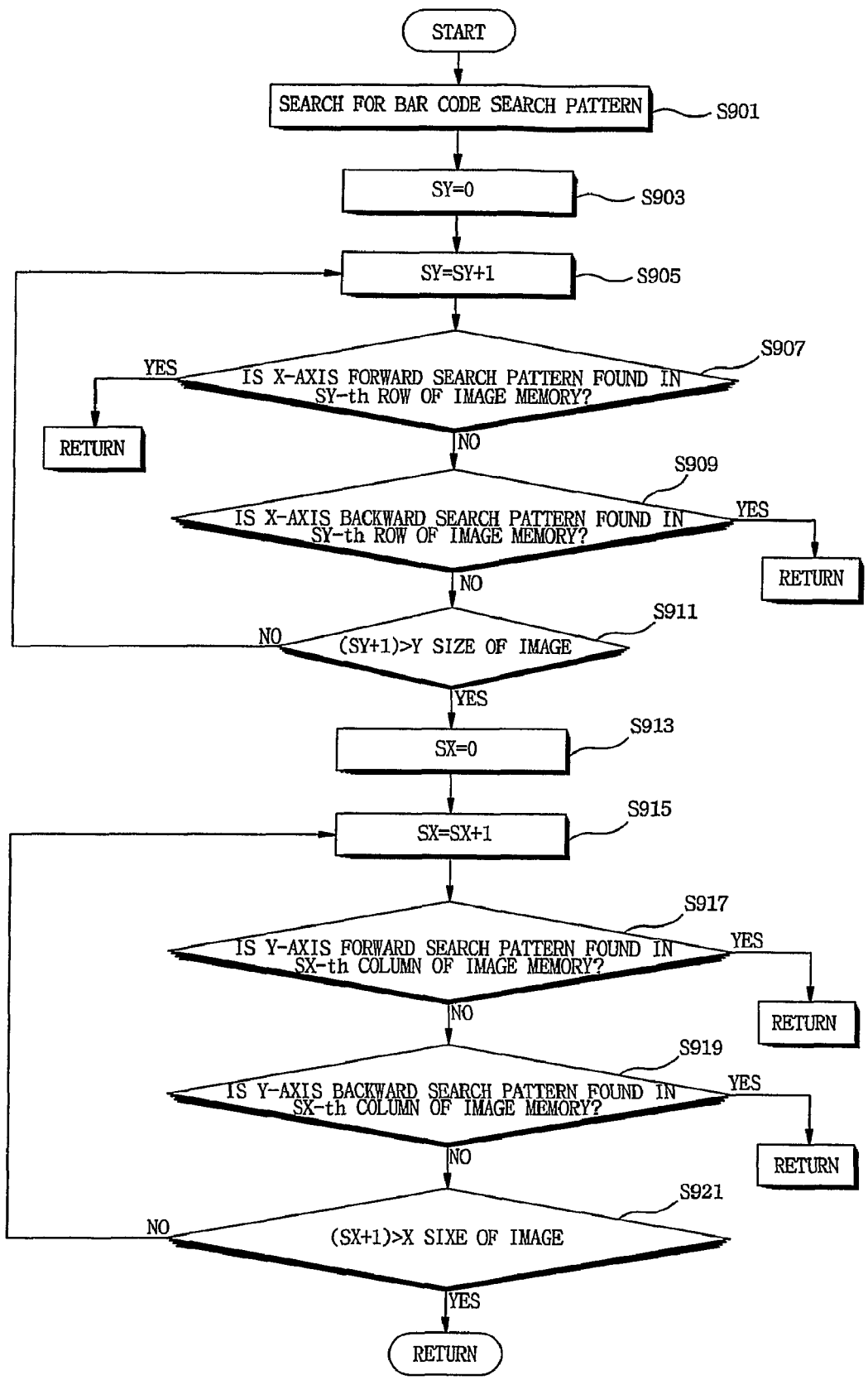
FIG. 9 is a flow chart showing the process of searching for a bar code search pattern shown in FIG. 8a in more detail.

FIG. 9 is a flow chart showing the process of searching for the bar code search pattern shown in FIG. 8a in more detail.

Figure 10A:
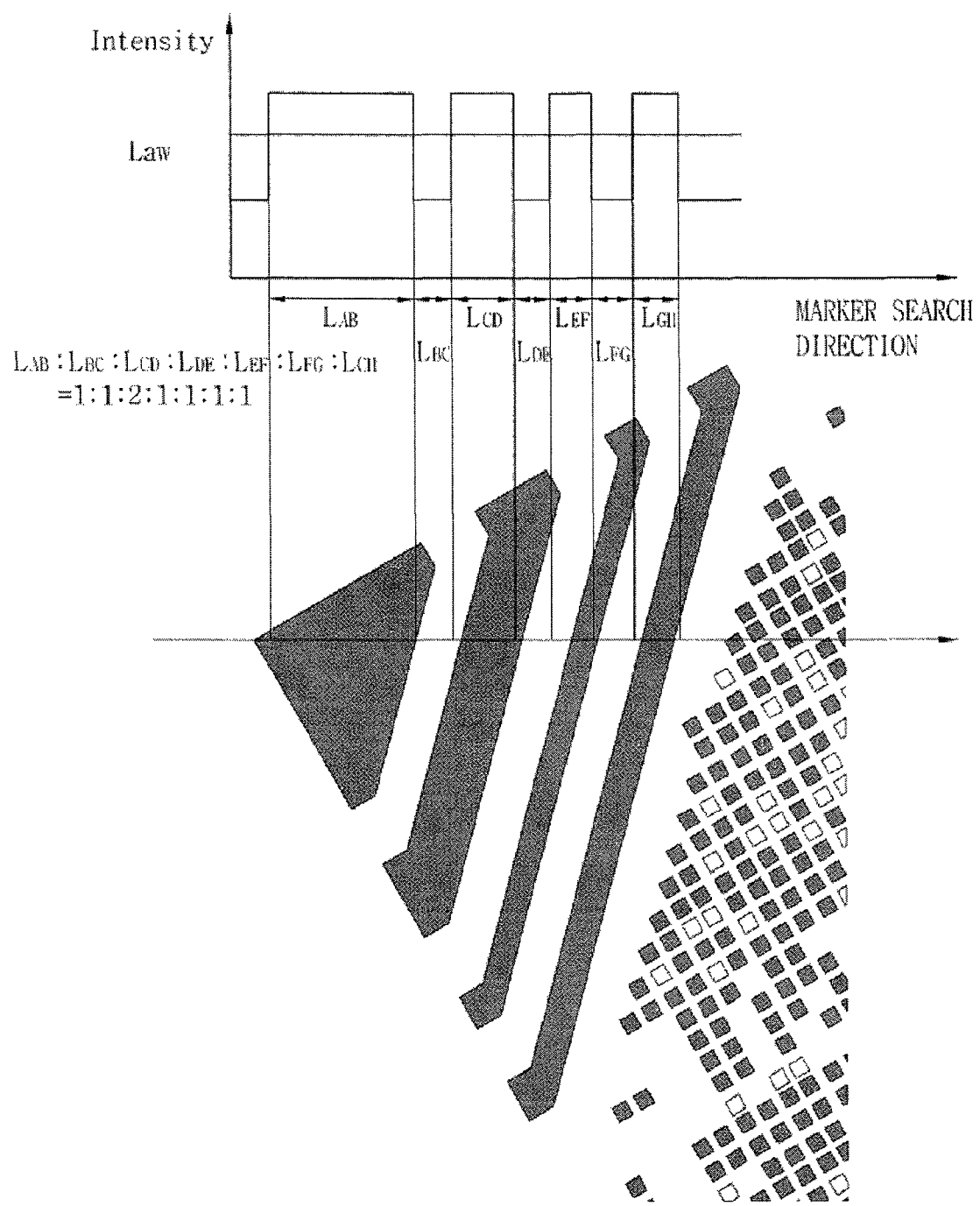
FIG. 10a illustrates the concept of searching for a bar code search pattern in an X-axis forward direction.
Figure 10C:
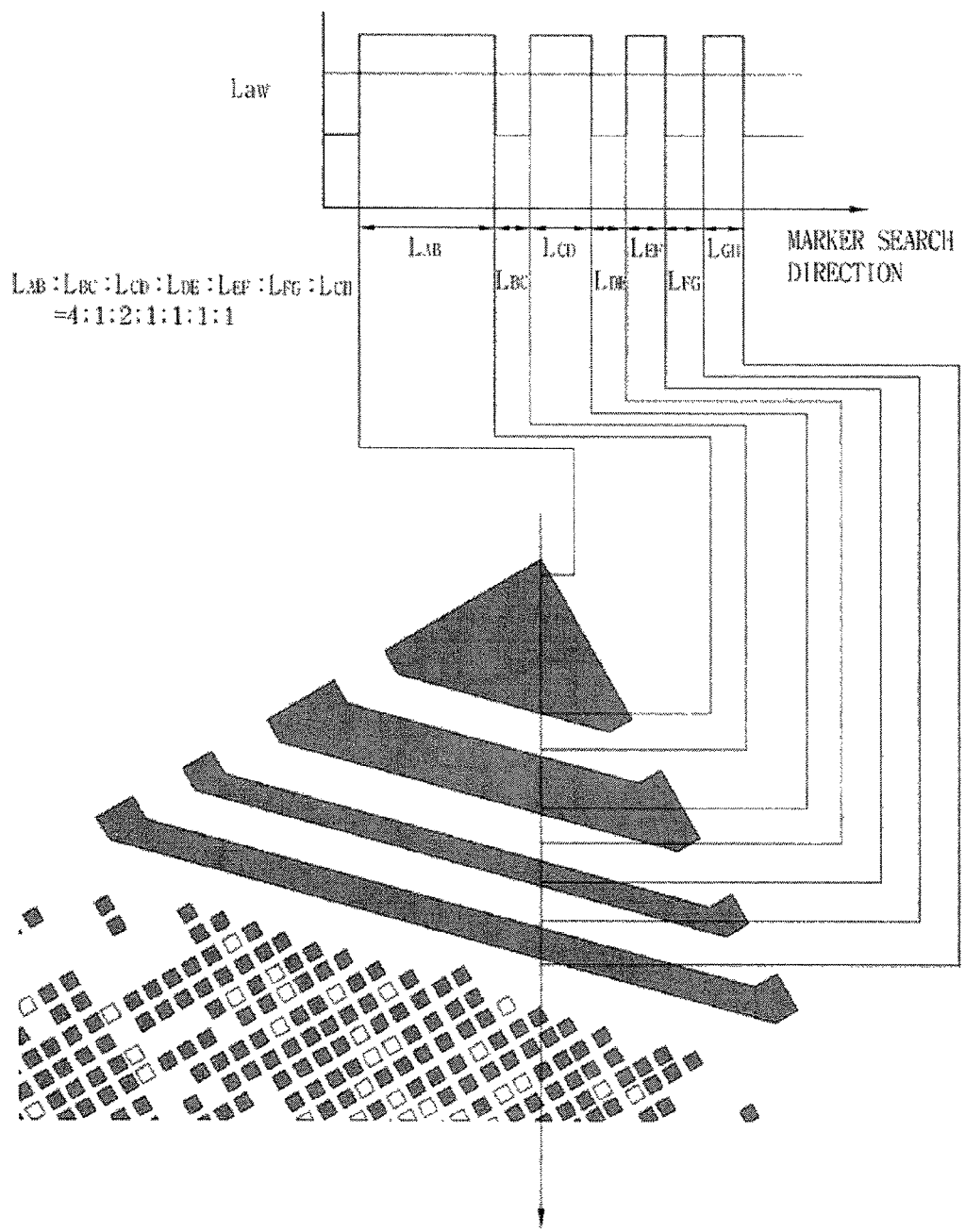
FIG. 10c illustrates the concept of searching for a bar code search pattern in an Y-axis forward direction.
Figure 10D:
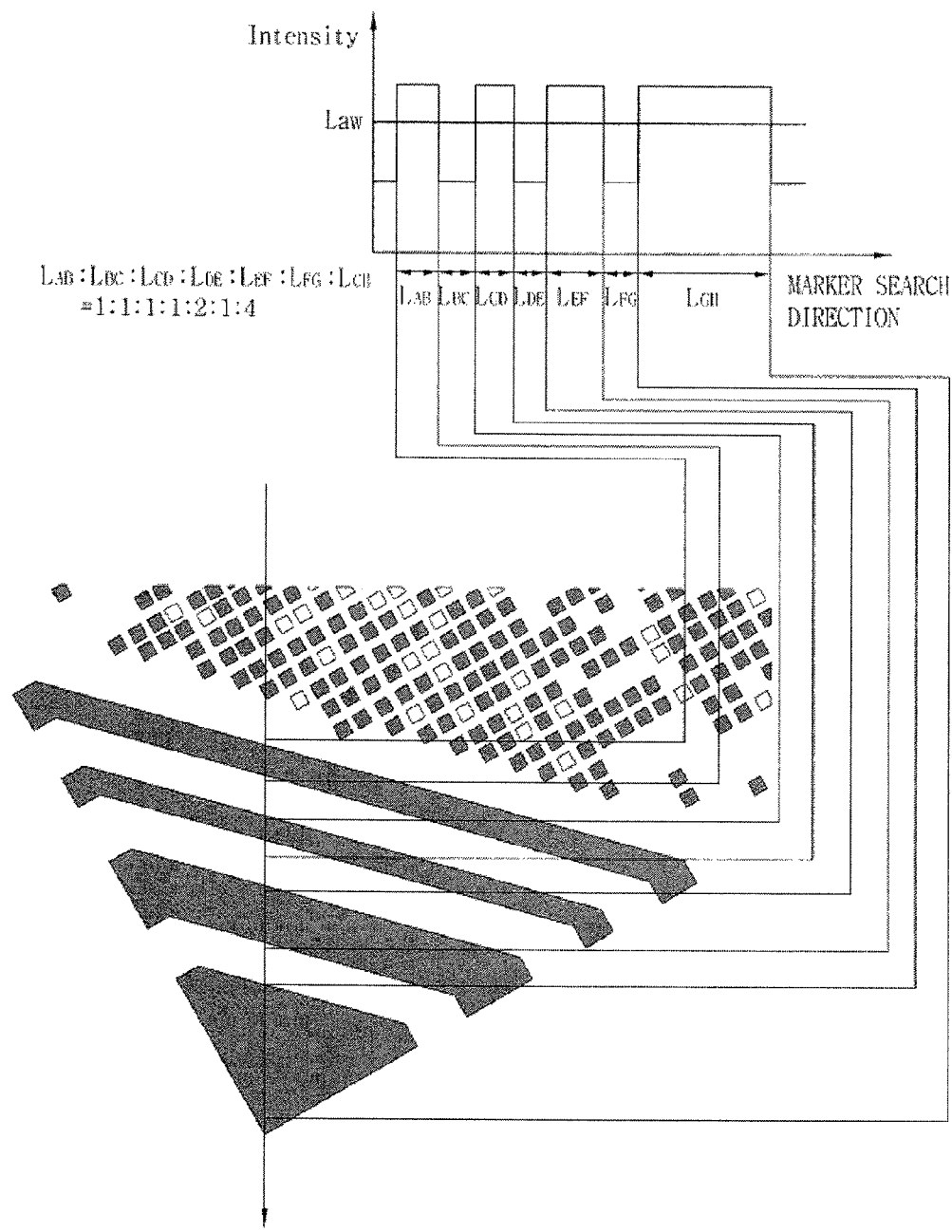
FIG. 10d illustrates the concept of searching for a bar code search pattern in an Y-axis backward direction.

FIG. 10a is a conceptual view showing a process of searching for the bar code search pattern in an X-axis forward direction, and FIG. 10b is a conceptual view showing a process of searching for the bar code search pattern in an X-axis backward direction. In addition, FIG. 10c is a conceptual view showing a process of searching for the bar code search pattern in an Y-axis forward direction, and FIG. 10d is a conceptual view showing a process of searching for the bar code search pattern in an Y-axis backward direction.

In the steps S901 through S905, SY that represents a row in the Y-axis direction is initialized and a step for repeated search is taken. In the step S907, it is determined whether the bar code search pattern is found in the X-axis forward direction from the SYth row of an image memory. Here, searching for the bar code search pattern in the X-axis forward direction is carried out by determining whether a ratio of the lengths of alternately arranged black and white portions of the bar code search pattern corresponds to a predetermined bar code start pattern.

In the embodiment of the present invention, the start point of a pattern in which a ratio of the lengths of black and white portions is 8:2:4:2:2:2:2 is set as the start point of the bar code search pattern (referring to FIG. 4a). FIG. 10a shows the process of searching for the bar code search pattern in the X-axis forward direction in connection with an actual bar code image. Referring to FIG. 10a, when a pattern in which $\{L_{AB}\}:\{L_{BC}\}:\{L_{CD}\}:\{L_{DE}\}:\{L_{EF}\}:\{L_{FG}\}:\{L_{GH}\}=8:2:4:2:2:2:2$ is found, the start point of this pattern is set as the start point of the bar code search pattern.

When the bar code search pattern is not found in the X-axis forward direction in the step S907, it is determined whether the bar code search pattern is found in the X-axis backward direction from the SYth row of the image memory in the step S909. Here, searching for the bar code search pattern in the X-axis backward direction is carried out by determining whether the ratio of the lengths of alternately arranged black and white portions of the bar code search pattern corresponds to the predetermined bar code start pattern.

In the embodiment of the present invention, the start point of the pattern in which the ratio of the lengths of the black and white portions is 8:2:4:2:2:2:2 is set as the start point of the bar code search pattern (referring to FIG. 4a). FIG. 10b shows the process of searching for the bar code search pattern in the X-axis backward direction in connection with an actual bar code image. Referring to FIG. 10b, when a pattern in which $\{L_{AB}\}:\{L_{BC}\}:\{L_{CD}\}:\{L_{DE}\}:\{L_{EF}\}:\{L_{FG}\}:\{L_{GH}\}=2:2:2:2:4:2:8$ is found, the start point of this pattern is set as the start point of the bar code search pattern.

When the bar code search pattern is not found in the X-axis backward direction in the step S909, it is determined whether the row in the Y-axis direction is larger than the Y size of the bar code image. When the Y-axis row is not larger than the Y size of the bar code image, the process returns to the step S905. When the Y-axis row is larger than the Y size of the bar code image, SX that represents a row in the X-axis direction is initialized in the steps S913 and S915 and a step for repeated search is taken. In the step S917, it is determined whether the bar code search pattern is found in the Y-axis forward direction from the SXth row of the image memory. Here, searching for the bar code search pattern in the Y-axis forward direction is carried out by determining whether the ratio of the lengths of the alternately arranged black and white portions of the bar code search pattern corresponds to the predetermined bar code start pattern.

In the embodiment of the present invention, the start point of the pattern in which the ratio of the lengths of black and white portions is 8:2:4:2:2:2:2 is set as the start point of the bar code search pattern (referring to FIG. 4a). FIG. 10c shows the process of searching for the bar code search pattern in the Y-axis forward direction in connection with an actual bar code image. Referring to FIG. 10c, when a pattern in which $\{L_{AB}\}:\{L_{BC}\}:\{L_{CD}\}:\{L_{DE}\}:\{L_{EF}\}:\{L_{FG}\}:\{L_{GH}\}=8:2:4:2:2:2:2$ is found, the start point of this pattern is set as the start point of the bar code search pattern.

When the bar code search pattern is not found in the Y-axis forward direction in the step S917, it is determined whether the bar code search pattern is found in the Y-axis backward direction from the SXth row of the image memory in the step S919. Here, searching for the bar code search pattern in the Y-axis backward direction is carried out by determining whether the ratio of the lengths of the black and white portions of the bar code search pattern corresponds to the predetermined bar code start pattern.

In the embodiment of the present invention, the start point of the pattern in which the ratio of the lengths of the black and white portions is 2:2:2:2:4:2:8 is set as the start point of the bar code search pattern (referring to FIG. 4a). FIG. 10d shows the process of searching for the bar code search pattern in the Y-axis backward direction in connection with an actual bar code image. Referring to FIG. 10d, when a pattern in which $\{L_{AB}\}:\{L_{BC}\}:\{L_{CD}\}:\{L_{DE}\}:\{L_{EF}\}:\{L_{FG}\}:\{L_{GH}\}=2:2:2:2:4:2:8$ is found, the start point of this pattern is set as the start point of the bar code search pattern.

When the bar code search pattern is not found in the Y-axis backward direction in the step S919, it is determined whether the row in the X-axis direction is larger than the X size of the bar code image. When the X-axis row is not larger than the X size of the bar code image, the process returns to the step S915. When the X-axis row is larger than the X size of the bar code image, the process is finished.

Figure 11:
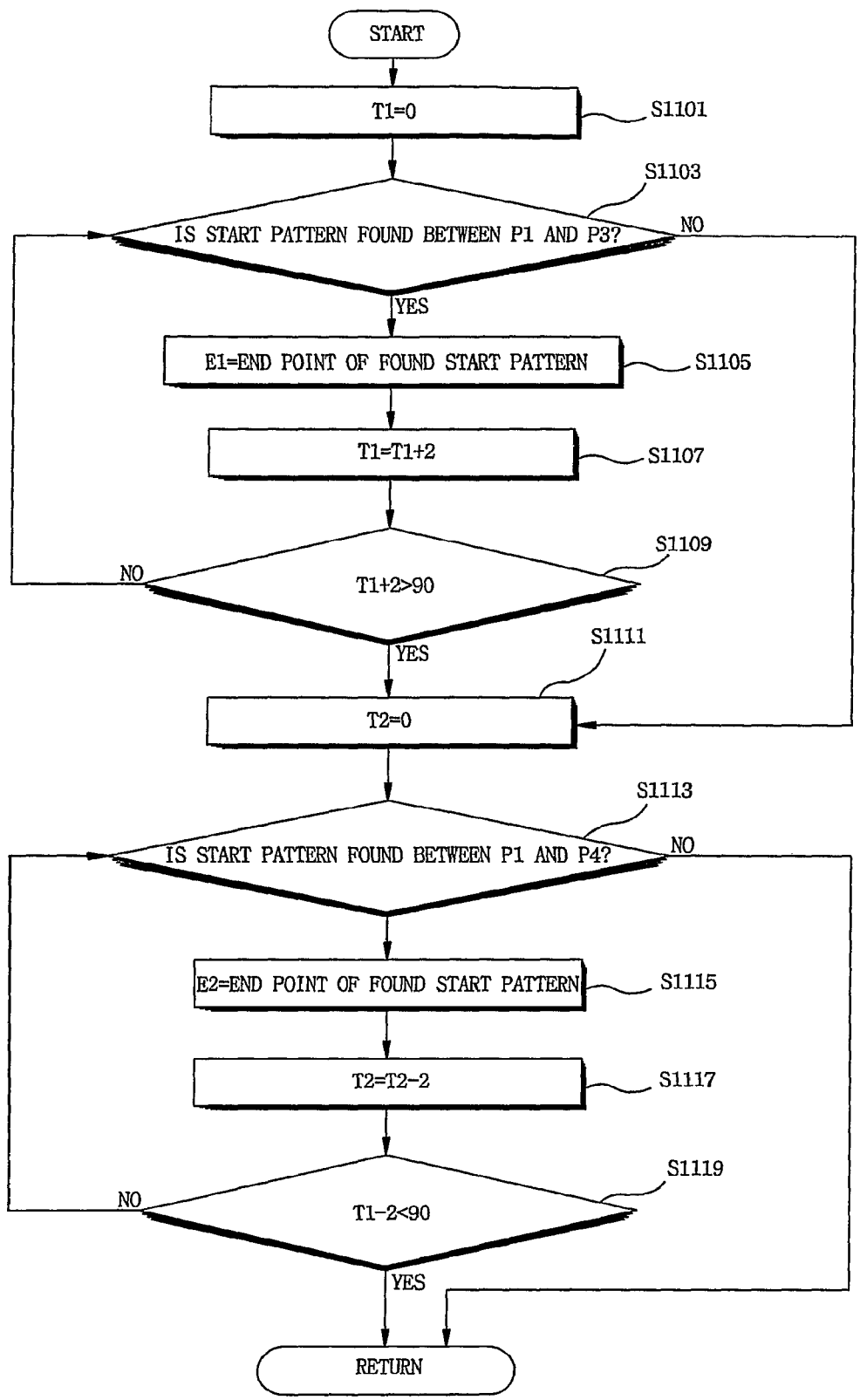
FIG. 11 is a flow chart showing the process of searching for corner points of the bar code search pattern shown in FIG. 8b in more detail.
Figure 12:
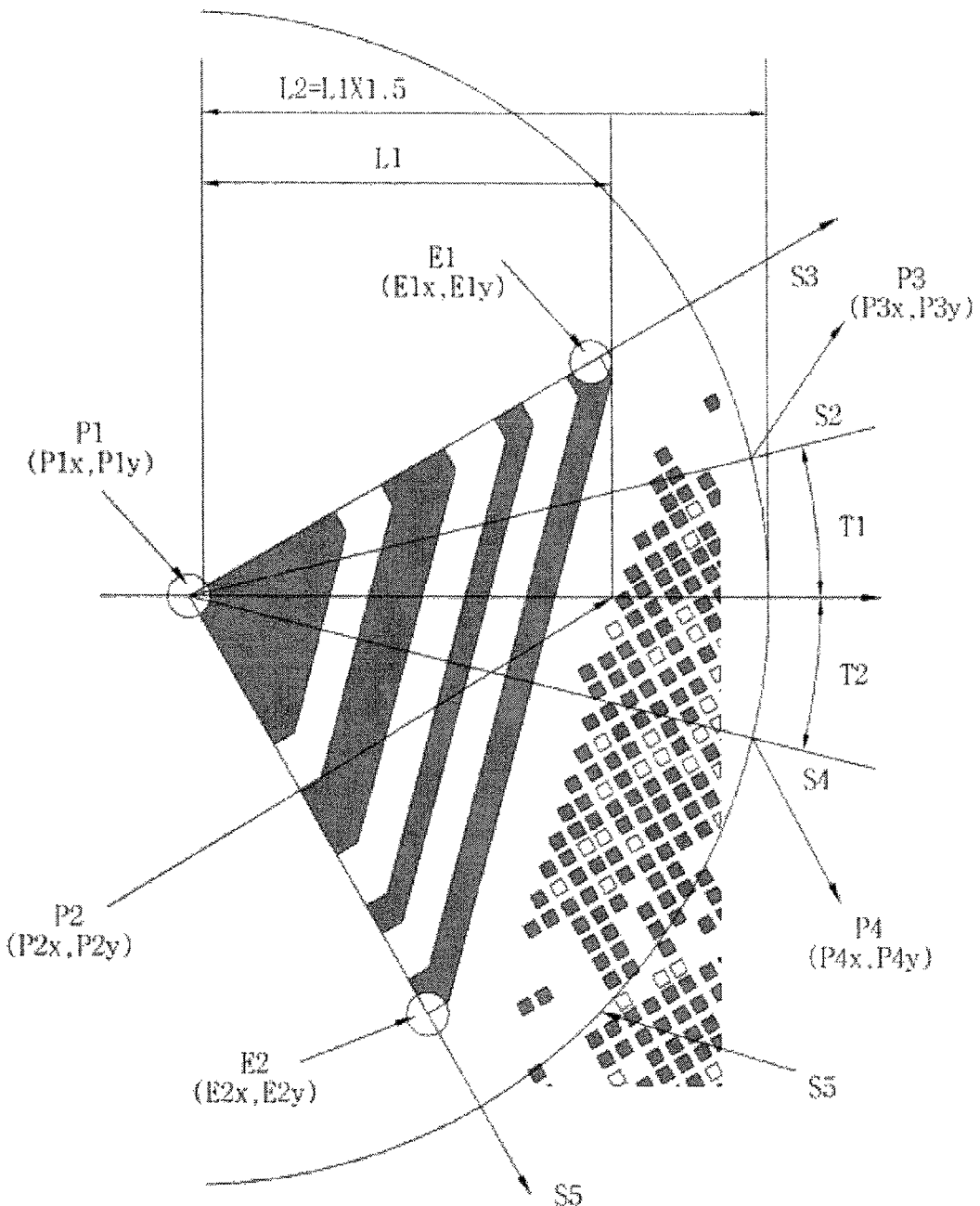
FIG. 12 is a conceptual view showing the process of searching for the corner points of the bar code search pattern in connection with an actual bar code image.

FIG. 11 is a flow chart showing the process of searching for the corner points of the bar code search pattern shown in FIG. 8b in more detail, and FIG. 12 is a conceptual view showing the process of searching for the corner points of the bar code search pattern in connection with an actual bar code image.

In FIG. 12, P1 represents the start point of the searched bar code search pattern (X and Y coordinates of P1 are P1x and P1y), P2 denotes the end point of the searched bar code search pattern (X and Y coordinates of P2 are P2x and P2y), P3 represents the intersection of a straight line S2 and a half-circle A1 used to search for the corner points of the bar code start pattern, and P4 denotes the intersection of a straight line S4 and the half-circle A1. In addition, L1 is the length of the searched bar code start pattern, L2 is the radius of the half-circuit A1, E1 represents the first corner point (X and Y coordinates of E1 are E1x and E1y) of the bar code search pattern, and E2 denotes the second corner point (X and Y coordinates of E2 are E2x and E1y) of the bar code search pattern. Furthermore, S1 is a line passing through P1 and P2, S2 and S4 are lines used to search for the corner points of the bar code start pattern, and S3 is a line passing through P1 and E1. Moreover, S5 is a line passing through P1 and E2, T1 is an angle between S1 and S2, and T2 is an angle between S1 and S4.

Referring to FIGS. 11 and 12, the angle T1 between the line S1 passing through the start point and the end point of the searched bar code search pattern and the line S2 for searching for the bar code corner points is initialized in the step S1101. Here, the unit of T1 is a degree (°). It is determined whether the bar code start pattern is found between P1 and P3 in the step S1103 and, when the start pattern is found, the end point of the found start pattern is set to E1 in the step S1105 and T1 is gradually increased in the step S1107.

That is, search is continuously carried out while increasing the angle T1. While the angle T1 is increased 2° by 2° in the embodiment of the present invention, the increase can be varied depending on a designer.

It is determined whether the increased angle exceeds 90° in the step S1109 and, when it does not, the process returns to the step S1103. When the increased angle exceeds 90°, the angle T2 is initialized to 0 in the step S1111.

It is determined whether the start pattern is found between P1 and P2 in the step S1113 and, when the start pattern is found, the end point of the found start pattern is set to E1 in the step S1115 and the angle T2 is gradually decreased in the step S1117. That is, search is continued while decreasing the angle T2. While the angle T2 is reduced 2° by 2° in the embodiment of the present invention, the decrease can be varied depending on a designer.

It is determined whether the decreased angle is smaller than 90° in the step S1119 and, when it is, the process is finished. Accordingly, the corner points E1 and E2 of the bar code search pattern can be obtained. When the decreased angle is not smaller than 90°, the process returns to the step S1113.

Figure 13:
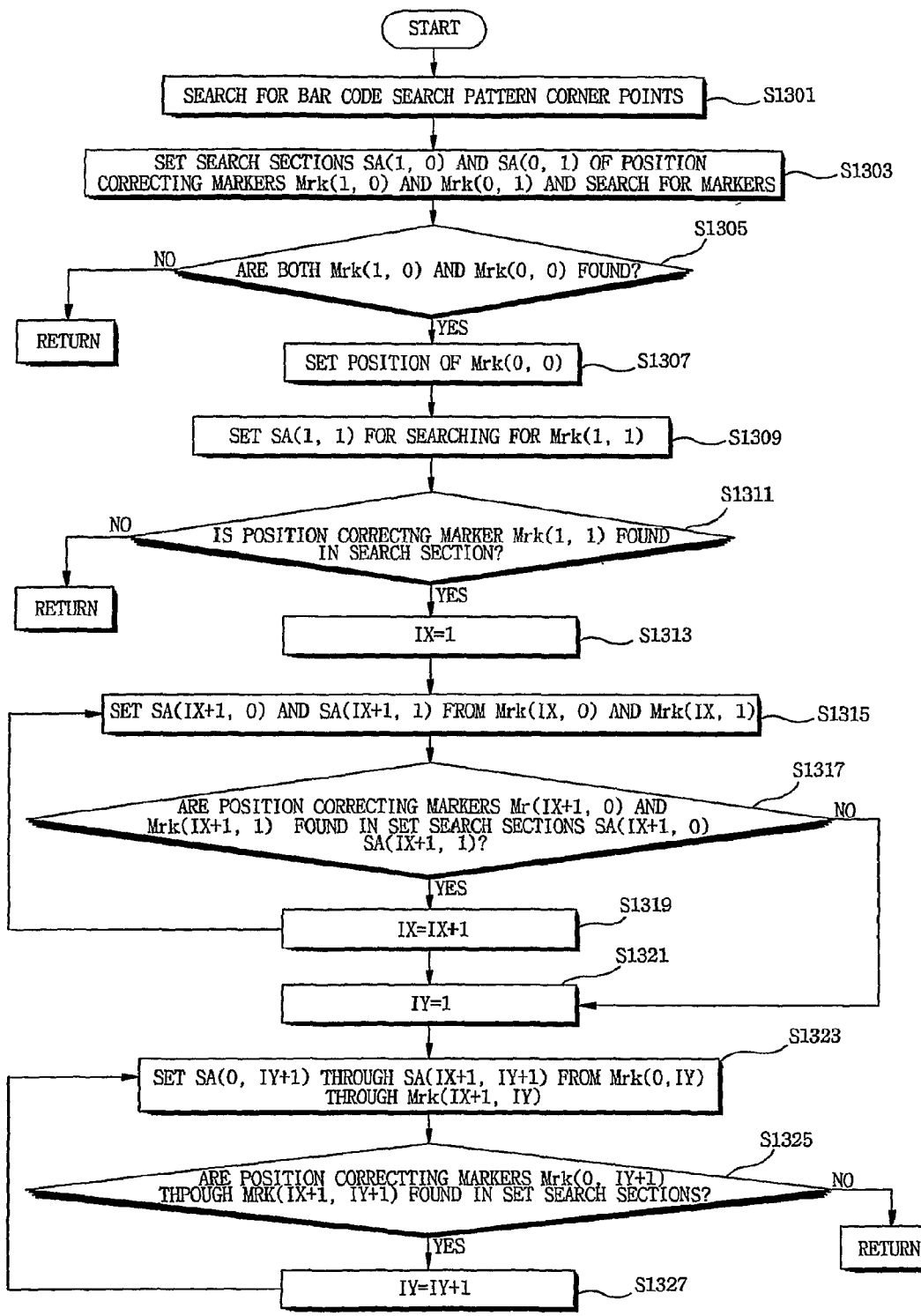
FIG. 13 is a flow chart showing the process of searching for position correcting markers shown in FIG. 8b in more detail.
Figure 14:
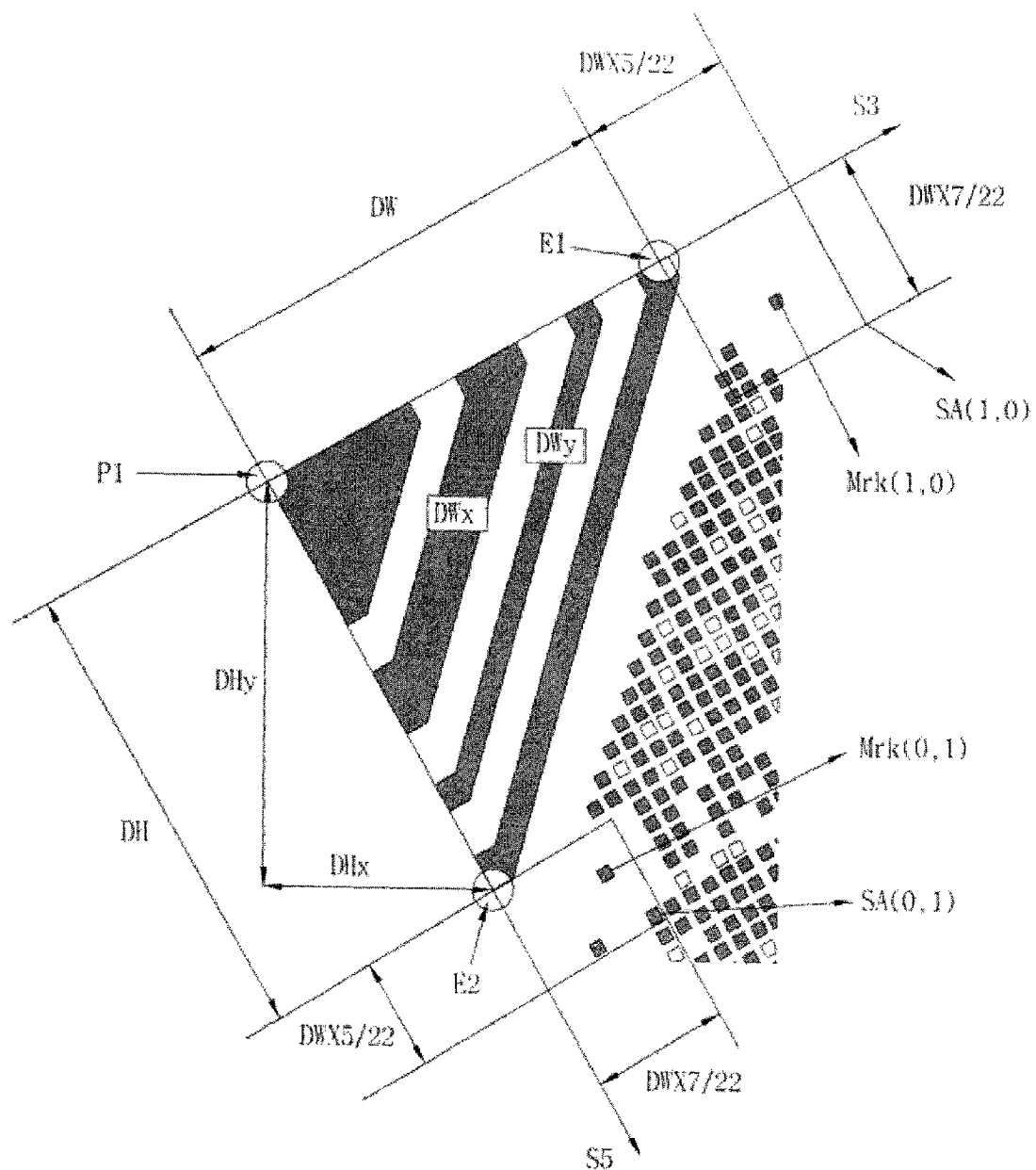
FIG. 14 is a conceptual view showing the process of searching for position correcting markers in connection with an actual bar code image.
Figure 15:
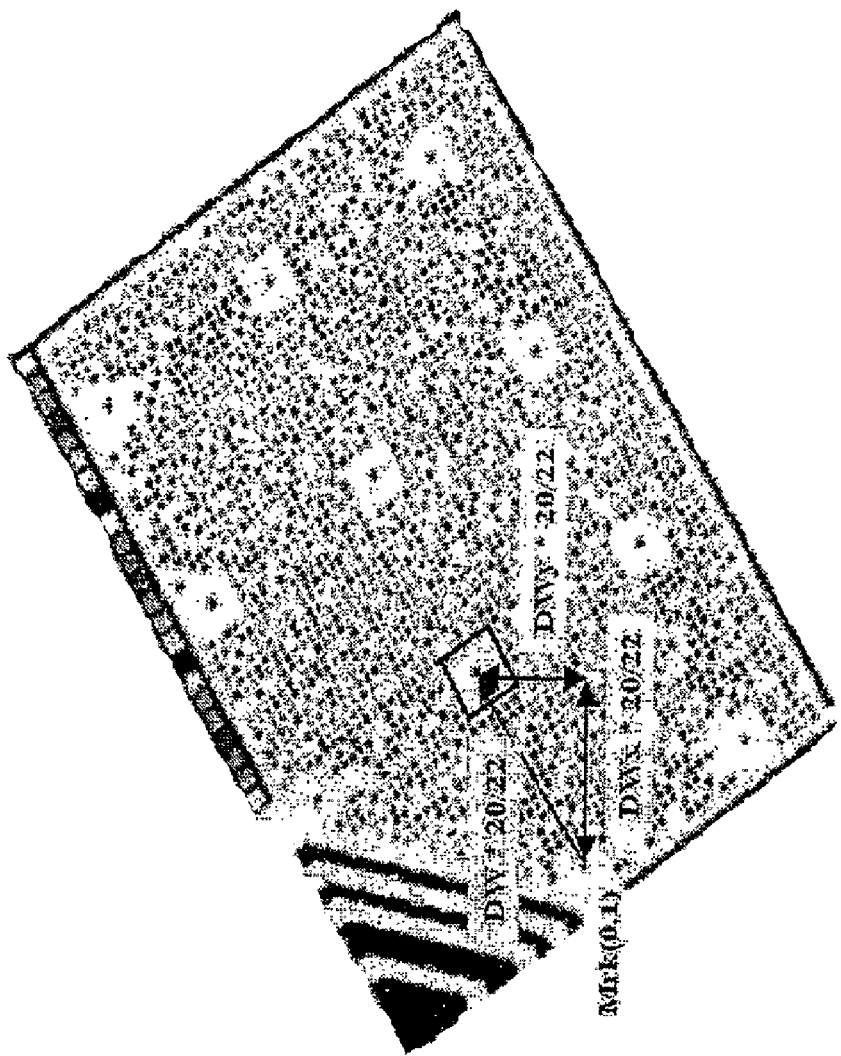
FIG. 15 is a conceptual view showing a method for setting a search section SA(1,1) for searching for a marker Mrk(1,1) in connection with an actual bar code image.

FIG. 13 is a flow chart showing the process of searching for the position correcting markers shown in FIG. 8b in more detail, and FIG. 14 is a conceptual view showing the process of searching for the position correcting markers in connection with an actual bar code image. FIG. 15 is a conceptual view showing a method for setting a search section SA(1,1) for searching for a marker Mrk(1,1) in connection with an actual bar code image.

In FIGS. 13, 14 and 15, DW represents the distance between the searched first corner point E1 and the start point P1 of the bar code search pattern (the distance in the X-axis direction between E1 and P1 is DWx and the distance in the Y-axis direction between E1 and P1 is DWy), and DH denotes the distance between the searched second corner point E2 and the start point P1 of the bar code search pattern (the distance in the X-axis direction between E2 and P1 is DHx and the distance in the Y-axis direction between E2 and P1 is DHy). In addition, SA(1,0) represents a marker search section for searching for a marker Mrk(1,0) and is a rectangular form perpendicular to a line S3. The length of two parallel sides of SA(1,0) is determined in proportion to the distance DH between P1 and E2, as shown in FIG. 14. Furthermore, SA(0,1) denotes a marker search section for searching for a marker Mrk(0,1) and is a rectangular form perpendicular to a line S5. The length of two parallel sides of SA(0,1) is determined in proportion to the distance DH between P1 and E2, as shown in FIG. 14.

Referring to FIGS. 13, 14 and 15, the corner points of the bar code search pattern are searched in the step S1301. Then, the position correcting marker Mrk(1,0) and the search sections SA(1,0) and S(0,1) of the marker Mrk(1,0) are set using P1, E1 and E2, as shown in FIG. 14, in the step S1303.

As described above, SA(1,0) is a rectangular form perpendicular to the line S3 and the length of horizontal two sides of SA(1,0) is determined in proportion to the distance DW between P1 and E1. In the embodiment of the present invention, the length of the horizontal two sides of SA(1,0) corresponds to DW*(the number of horizontal pixels of the marker)/(the number of pixels of the bar code start pattern), that is, DW*5/22 (referring to FIGS. 4a and 4b).

The length of vertical two sides of SA(1,0) corresponds to DW*(the number of vertical pixels of the marker+the number of pixels in the thickness direction of the bar code start pattern)/(the number of pixels of the bar code start pattern), that is, DW*7/22.

In the step S1307, it is determined whether both the position correcting markers Mrk(1,0) and Mrk(0,1) are found. When they are found, the position of a marker Mrk(0,0) is set in the step S1307. Here, a position correcting marker is found in such a manner that a pixel whose neighboring pixels have a value higher than the value of the entire image is found from points having values lower than the mean value of the image and the coordinates of the pixel are set as the coordinates of the position correcting marker.

The coordinates of Mrk(0,0) are set as follows.

$$Mrk(0,0)=MrkX(1,0)-DWx$$

$$MrkY(0,0)=MrkY(1,0)-DWy$$

In the step S1309, SA(1,1) for searching for Mrk(1,1) is set. Specifically, as shown in FIG. 15, a square having a center point distant from Mrk(0,1) by DWx in the X-axis direction and DWy in the Y-axis direction, four sides each have a length of DW*5/22 and a slope corresponding to S3 is set as SA(1,1).

In the step S1311, it is determined whether the position correcting marker Mrk(1,1) is found in the search section SA(1,1). When it is found, IX that represents a row in the X-axis direction is initialized to 1 in the step S1313, and then search sections SA(IX+1,0) and SA(IX+1,1) are set from markers Mrk(IX,0) and Mrk(IX,1).

Specifically, a square having a center point distant from Mrk(IX,0) by DWx in the X-axis direction and DWy in the Y-axis direction, four sides each have a length of DW*5/22 and a slope corresponding to S3 is set as SA(IX+1,0). A square having a center point distant from Mrk(IX,1) by DWx in the X-axis direction and DWy in the Y-axis direction, four sides each have a length of DW*5/22 and a slope corresponding to S3 is set as SA(IX+1,1).

In the step S1317, it is determined whether both the position correcting markers Mrk(IX+1,0) and Mrk(IX+1,1) are found in the search sections SA(IX+1,0) and SA(IX+1,1). When they are found, 1 is added to IX, and then the process returns to the step S1315. When they are not found, IY that represents a column in the Y-axis direction is initialized to 1 in the step S1321.

In the step S1323, search sections SA(0, IY+1) through SA(IX+1, IY+1) are set from markers Mrk(0,IY) through Mrk(IX+1,IY). That is, a square having a center point distant from Mrk(n,m) by DHx in the X-axis direction and DHy in the Y-axis direction, four sides each have a length of DW*5/22 and a slope corresponding to S3 is set as SA(n,m+1).

In the step S1325, it is determined whether all the position correcting markers Mrk(0,IY+1) through Mrk(IX+1,IY+1) are found in the set search sections. When they are found, 1 is added to IY and the process returns to the step S1323.

Figure 16:
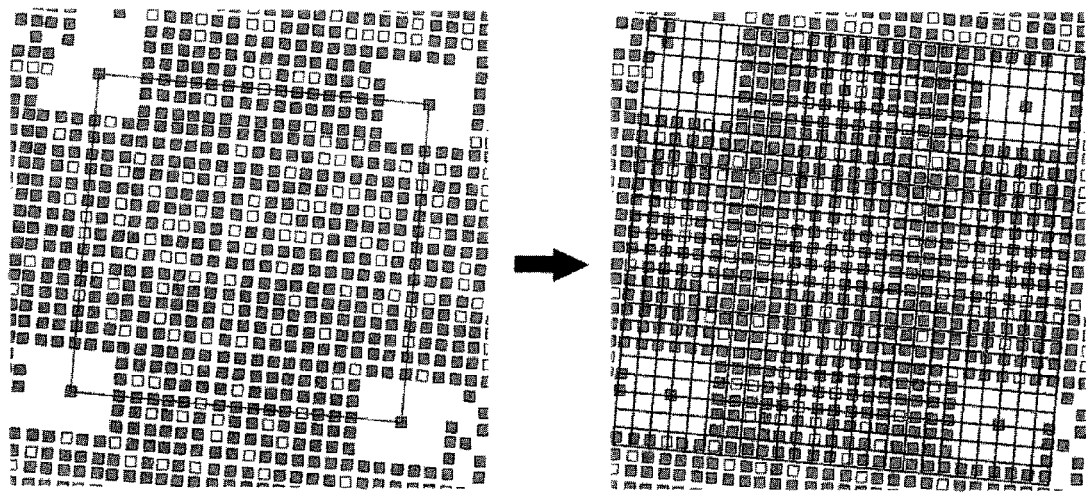
FIG. 16 is a conceptual view showing a method for grasping bar code pixel positions using position correcting markers.

FIG. 16 is a conceptual view showing a method of grasping bar code pixel positions using the position correcting markers. Referring to FIG. 16, the position correcting markers are searched through the above-described process, and then the positions of points around four corner points of each search section are estimated.

Figure 17:
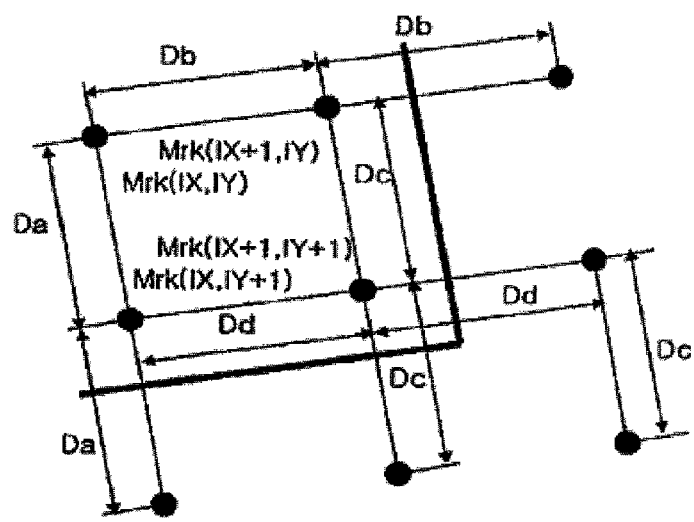
FIG. 17 illustrates the concept of storing larger quantity of data by virtually extending position correcting markers according to an embodiment of the present invention.

FIG. 17 illustrates the concept of storing larger quantity of data by virtually extending the position correcting markers according to an embodiment of the present invention.

When the 2-dimensional bar code size is determined, normalized markers may not cover the entire 2-dimensional bar code but only a part of it. In this case, a virtual marker is needed to record data in parts of the bar code, which are not covered by the markers. Furthermore, markers at the corners of the bar code can be extended in order to process data pattern coordinates that do not belong to any one of the corners of the bar code.

Figure 18A:
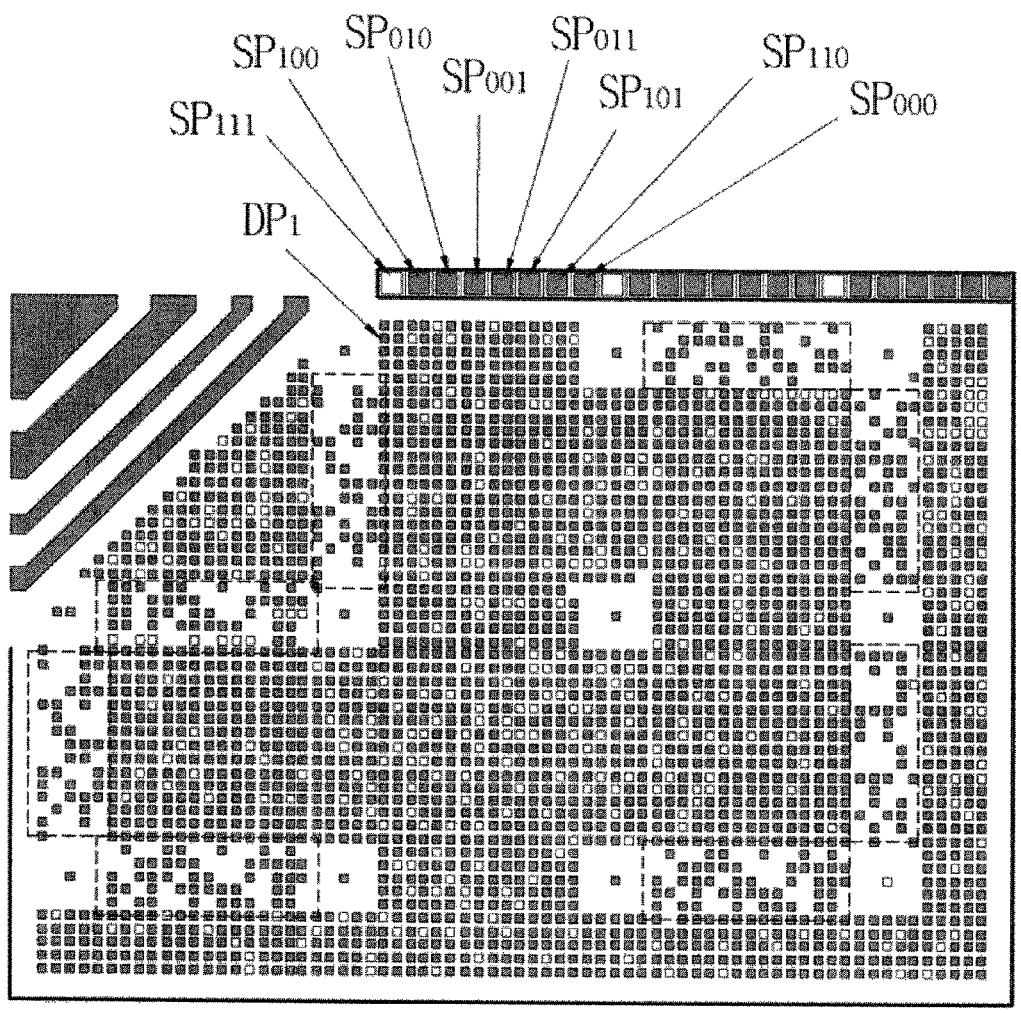
FIG. 18a illustrates an example of sampling a color correction pattern according to an embodiment of the present invention.

FIG. 18a is a conceptual view showing a process of correcting the color of a bar code according to an embodiment of the present invention. Referring to FIG. 18a, RGB values are read from sampling points $SP_{111}$, $SP_{100}$, $SP_{010}$, $SP_{001}$, $SP_{011}$, $SP_{101}$, $SP_{110}$ and $SP_{000}$, of the color correction pattern.

FIG. 18b is a color correction table showing the RGB values read from the sampling points of FIG. 18a. Referring to FIG. 18b, the RGB values have a minimum value of 0 and a maximum value 255.

When a bar code is decoded, the RGB value of a data pattern to be decoded is read and a binary value corresponding to a sampling value of the color correction table, which is the most similar to the RGB value, is determined as a color correction result.

The RGB value of a sampling point $DP_1$ for decoding the data pattern is (96, 241, 91). This RGB value is the most similar to the RGB value of $SP_{101}$ of the color correction table, and thus the binary value of $DP_1$ is set to 010.

When the RGB value of the color correction table is compared to the RGB value of the data pattern, the color having the highest correlation is selected using generally used correlation measurement of RGB value. The binary value obtained through the color correction process is used as the original data and additional data in the data extracting unit.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for decoding a large capacity 2-dimensional color bar code, comprising:
    a first step of reading an encoded 2-dimensional bar code image and searching for a bar code search pattern to obtain the coordinates and slope of a bar code start position on a memory;
    a second step of searching for corner points E1 and E2 of the searched bar code search pattern;
    a third step of searching for the coordinates of position correcting markers using the coordinates of the bar code search pattern and the corner points of the bar code search pattern;
    a fourth step of reading the coordinates, data value and meta data of a data pattern of each section using the searched coordinates of the position correcting markers; and
    a fifth step of correcting data pattern colors of the bar code.

2. The decoding method of claim 1, wherein the first step sets axes perpendicular to each other and searching for the bar code search pattern in an X-axis forward direction, an X-axis backward direction, an Y-axis forward direction and an Y-axis backward direction, respectively.

3. The decoding method of claim 2, wherein, when a predetermined bar code start pattern is searched, the start point of the bar code start pattern is set as the start point of the bar code search pattern.

4. The decoding method of claim 1, wherein the second step comprises:
    a first sub-step of initializing an angle T1 between a straight line S1 passing through the start point and the end point of the searched bar code search pattern and a straight line S2 for searching for the corners of the bar code;
    a second sub-step of determining whether the bar code start pattern is found between P1 and P3 and, when the bar code start pattern is found, setting the end point of the found bar code start pattern to E1 and then gradually increasing the angle T1;

a third sub-step of determining whether the increased angle exceeds 90°, returning to the second sub-step when the increased angle does not exceed 90°, and initializing an angle T2 to 0when the angle exceeds 90°;

a fourth sub-step of determining whether the bar code start pattern is found between P1 and P4 and, when it is, setting the end point of the bar code start pattern to E2 and then gradually decreasing the angle T2; and a fifth sub-step of determining whether the decreased angle is smaller than 90° and, when it is, finishing the process to obtain the corner points E1 and E2 of the bar code search pattern.

5. The decoding method of claim 1, wherein the third step comprises :

a first sub-step of setting search sections SA(I, 0) and SA(O, 1) for searching for position correcting markers Mrk(1,0) and Mrk(0,1);

a second sub-step of determining whether both the position correcting markers Mrk(1,0) and Mrk(0,1) are found in the search sections SA(I, 0) and SA(O, 1) and, when they are found, setting the position of a position correcting marker Mrk(0, 0);

a third sub-step of setting a search section SA(I, 1) for searching for a position correcting marker Mrk(1,1);

a fourth sub-step of determining whether the position correcting marker Mrk(1,1) is found in the search section SA(1, 1) and, when it is, initializing IX that represents a row in the X-axis direction and then setting search sections SA(IX+1,0) and SA(IX+1,1) from position correcting markers Mrk(IX,0) and Mrk(IX,1);

a fifth sub-step of determining whether position correcting markers Mrk (IX+1, 0) and Mrk(IX+1,1) are found in the search section SA(IX+1, 0) and SA(IX+1,1), adding 1 to IX and returning to the fourth sub-step when the position correcting markers Mrk(IX+1, 0) and Mrk(IX+1, 1) are found, and initializing IY that represents a column in the Y-axis direction when the position correcting markers Mrk(IX+1, 0) and Mrk(IX+1, 1) are not found;

a sixth sub-step of setting search sections SA(O, IY+1) through SA(IX+1, IY+1) from position correcting markers Mrk (0,IY) through Mrk(IX+1, IY) ; and a seventh sub-step of determining whether all of position correcting markers Mrk (0, IY+1) through Mrk(IX+1, IY+1) are found in the search sections SA(O, IY+1) through SA(IX+1, IY+1) and, when they are all found, adding 1 to IY and then returning to the sixth sub-step.

6. The decoding method of claim 5, wherein the search section SA(I, 0) is a rectangular form perpendicular to a straight line S3, and the length of two parallel sides of the search section SA(I, 0) is determined in proportion to the distance DW between P1 and E1.

7. The decoding method of claim 6, wherein the horizontal length of SA(I, 0) is set to DW*(the number of horizontal pixels of the corresponding marker)/(the number of pixels of the bar code start pattern), and its vertical length is set to DW*(the number of vertical pixels of the corresponding marker+the number of pixels in the thickness direction of the bar code start pattern)/(the number of pixels of the bar code start pattern).

8. The decoding method of claim 5, wherein the position of Mrk(0,0) in the second sub-step is set as follows MrkX(0,0)= MrkX(1,O)–DWx MrkY(0,0)=MrkY(1,0)–Dwy.

9. The decoding method of claim 5, wherein the search section SA(I7I) in the third sub-step is set to a square having a central point distant from the marker Mrk(0,1) by DWx in the X-axis direction and DWy in the Y- axis direction, four sides each have a length of DW*(the number of horizontal pixels of the marker)/(the number of pixels of the bar code start pattern), and a slope corresponding to S3.

10. The decoding method of claim 5, wherein the search section SA(IX+1,O) in the fourth sub-step is set to a square having a central point distant from the marker Mrk(IX,0) by DWx in the X-axis direction and DWy in the Y-axis direction, four sides each have a length of DW*(the number of horizontal pixels of the marker)/(the number of pixels of the bar code start pattern) and a slope corresponding to S3, and the search section SA(IX+1,1) is set to a square having a central point distant from the marker Mrk(IX,1) by DWx in the X-axis direction and DWy in the Y-axis direction, four sides each have a length of DW*(the number of horizontal pixels of the marker)/(the number of pixels of the bar code start pattern) and a slope corresponding to S3.

11. The decoding method of claim 1, wherein the position correcting markers include virtual markers obtained by extending markers at the corners of the bar code, to process data pattern coordinates that do not belong to any one of the corners of the bar code.

12. The decoding method of claim 1, wherein all the colors of a color correction pattern are read to form a color correction table, data pattern colors are compared to the colors of the color correction table, and the data pattern colors are converted into binary values corresponding to the colors the most similar to the data pattern colors.

13. A system for decoding a large capacity 2-dimensional color bar code, comprising:

a bar code search pattern searching unit for receiving a 2-dimensional bar code image and searching for a bar code search pattern of the 2-dimensional bar code to obtain the coordinates and slope of the bar code start point;

a bar code search pattern corner point searching unit for obtaining corner points of the bar code search pattern using the searched coordinates of the bar code search pattern;

a position correcting marker searching unit for searching for the coordinates of position correcting markers using the coordinates of the bar code search pattern and the corner points; and a data extracting unit for extracting data with reference to the searched coordinates of the position correcting markers.

14. The decoding system of claim 13, further comprising a meta data extracting unit for extracting meta data using the coordinates of the position correcting markers.

15. The decoding system of claim 14, further comprising:

an error detecting/correcting unit for carrying out error detection/correction with reference to additional data for error detection/correction from the extracted data and meta data, and then extracting compressed original data; and a decompressing unit for decompressing the compressed original data to decode the original data.

16. The decoding system of claim 13, wherein the bar code search pattern searching unit sets axes perpendicular to each other, and searches for the bar code search pattern in an X-axis forward direction, an X-axis backward direction, an Y-axis forward direction and an Y-axis backward direction, respectively.

17. The decoding system of claim 13, wherein the bar code search pattern corner point searching unit determines whether a bar code start pattern is found between P1 and P3, sets the end point of the found bar code start pattern as E1 when the bar code start pattern is found, determines whether the bar code start pattern is found between P1 and P4, and sets the end point of the bar' code start pattern as E2 when the bar code start pattern is found between P1 and P4, to thereby set E1 and E2 as the corner points of the bar code search pattern.

18. The decoding system of claim 13, wherein the position correcting markers include virtual markers obtained by extending markers at the corners of the bar code in order to process data pattern coordinates that do not belong to any one of the corners of the bar does.

\* \* \* \* \*